United States Patent [19]

Sudman et al.

[11] Patent Number: 5,601,436

[45] Date of Patent: *Feb. 11, 1997

[54] APPARATUS AND METHOD FOR GENERATING AND PRESENTING AN AUDIOVISUAL LESSON PLAN

[75] Inventors: David Sudman, Gurnee; Joseph Ulowetz, Northbrook; Dilip Singhi, Glenview; Maureen Pajerski, Rolling Meadows, all of Ill.

[73] Assignee: Rauland-Borg Corporation, Skokie, Ill.

[ * ] Notice: The term of this patent shall not extend beyond the expiration date of Pat. No. 5,385,475.

[21] Appl. No.: 380,088

[22] Filed: Jan. 30, 1995

Related U.S. Application Data

[63] Continuation of Ser. No. 40,468, Apr. 1, 1993, Pat. No. 5,385,475.

[51] Int. Cl.$^6$ ........................................................ G09B 5/00
[52] U.S. Cl. ...................... 434/307 R; 434/118; 434/350; 395/501; 348/8; 340/325.22; 455/4.1
[58] Field of Search ........................ 434/118, 307 R–308, 434/323, 350, 362, 365; 364/514; 348/8, 61, 460, 552; 340/825.06, 825.22, 825.24, 825.52, 825.55; 395/154; 455/4.2, 5.1, 6.1; 360/33.1

[56] References Cited

U.S. PATENT DOCUMENTS

| | | |
|---|---|---|
| 3,691,528 | 9/1972 | Calvagna et al. ................. 340/825.07 |
| 3,691,650 | 9/1972 | Arnold et al. . |
| 3,753,240 | 8/1973 | Merwin . |
| 3,936,595 | 2/1976 | Yanagimachi et al. . |
| 4,000,510 | 12/1976 | Cheney et al. . |
| 4,021,933 | 5/1977 | Hughes . |
| 4,386,375 | 5/1983 | Altman . |
| 4,579,533 | 4/1986 | Anderson et al. ............. 434/307 R X |
| 4,586,905 | 5/1986 | Groff . |
| 4,602,907 | 7/1986 | Foster . |
| 4,609,358 | 9/1986 | Sangster . |
| 4,671,772 | 6/1987 | Slade et al. ............................ 434/219 |
| 4,675,755 | 6/1987 | Baumeister et al. . |
| 4,684,349 | 8/1987 | Ferguson et al. . |
| 4,689,022 | 8/1987 | Peers et al. . |
| 4,695,975 | 9/1987 | Bedrij . |
| 4,717,971 | 1/1988 | Sawyer . |
| 4,772,206 | 9/1988 | Kerr et al. . |
| 4,775,935 | 10/1988 | Yourick . |
| 4,796,099 | 1/1989 | Compton . |
| 4,798,543 | 1/1989 | Spiece . |

(List continued on next page.)

OTHER PUBLICATIONS

Multimedia Distance Learning, systems description dated Jan. 2, 1992, pp. 17–19.
Interactive Television Studio, design proposal dated Oct. 4, 1991, pp. 28–30.
Discourse® Educational Communication System Operating Reference Manual, Version 3.7, Dec., 1993.

*Primary Examiner*—Joe Cheng
*Attorney, Agent, or Firm*—Leydig, Voit & Mayer, Ltd.

[57] ABSTRACT

A system and method for generating and presenting a lesson plan comprising audiovisual materials to a classroom. The system enables the automatic connection of audiovisual output signals from one or more audiovisual resources to classroom monitors in accordance with a predetermined sequence called a "lesson plan." The lesson plan includes labels for identifying selected ones of the audiovisual resources, and control commands for controlling the selected audiovisual resources. At a scheduled date and time, the lesson plan is loaded into the system and processed to automatically connect the output signals from selected audiovisual resources to specified monitors, and also to control the playback of the resources.

The system also includes a software program for generating the lesson plan and saving it for a future presentation. To assist with the generation and presentation, a database of available materials and a scheduling program are also provided.

15 Claims, 21 Drawing Sheets

U.S. PATENT DOCUMENTS

| | | |
|---|---|---|
| 4,804,328 | 2/1989 | Barrabee . |
| 4,863,384 | 9/1989 | Slade . |
| 4,887,157 | 12/1989 | Matsuzaki et al. .......................... 348/8 |
| 4,893,256 | 1/1990 | Rutherfoord et al. . |
| 4,920,432 | 4/1990 | Eggers et al. .......................... 360/33.1 |
| 4,945,476 | 7/1990 | Bodick et al. . |
| 5,008,853 | 4/1991 | Bly et al. . |
| 5,018,082 | 5/1991 | Obata et al. . |
| 5,065,345 | 11/1991 | Knowles et al. . |
| 5,099,422 | 3/1992 | Foresman et al. ................. 360/14.1 X |
| 5,109,482 | 4/1992 | Bohrman . |
| 5,119,474 | 6/1992 | Beitel et al. . |
| 5,120,230 | 6/1992 | Clark et al. . |
| 5,132,992 | 7/1992 | Yurt et al. ................................. 455/5.1 |
| 5,173,051 | 12/1992 | May et al. . |
| 5,175,851 | 12/1992 | Johnson et al. . |
| 5,176,520 | 1/1993 | Hamilton ................................. 434/350 |
| 5,193,208 | 3/1993 | Yokota et al. ................. 340/825.24 X |
| 5,223,825 | 6/1993 | Ikezaki ........................... 340/825.25 X |
| 5,385,475 | 1/1995 | Sudman et al. ..................... 434/307 R |
| 5,389,963 | 2/1995 | Lepley et al. . |

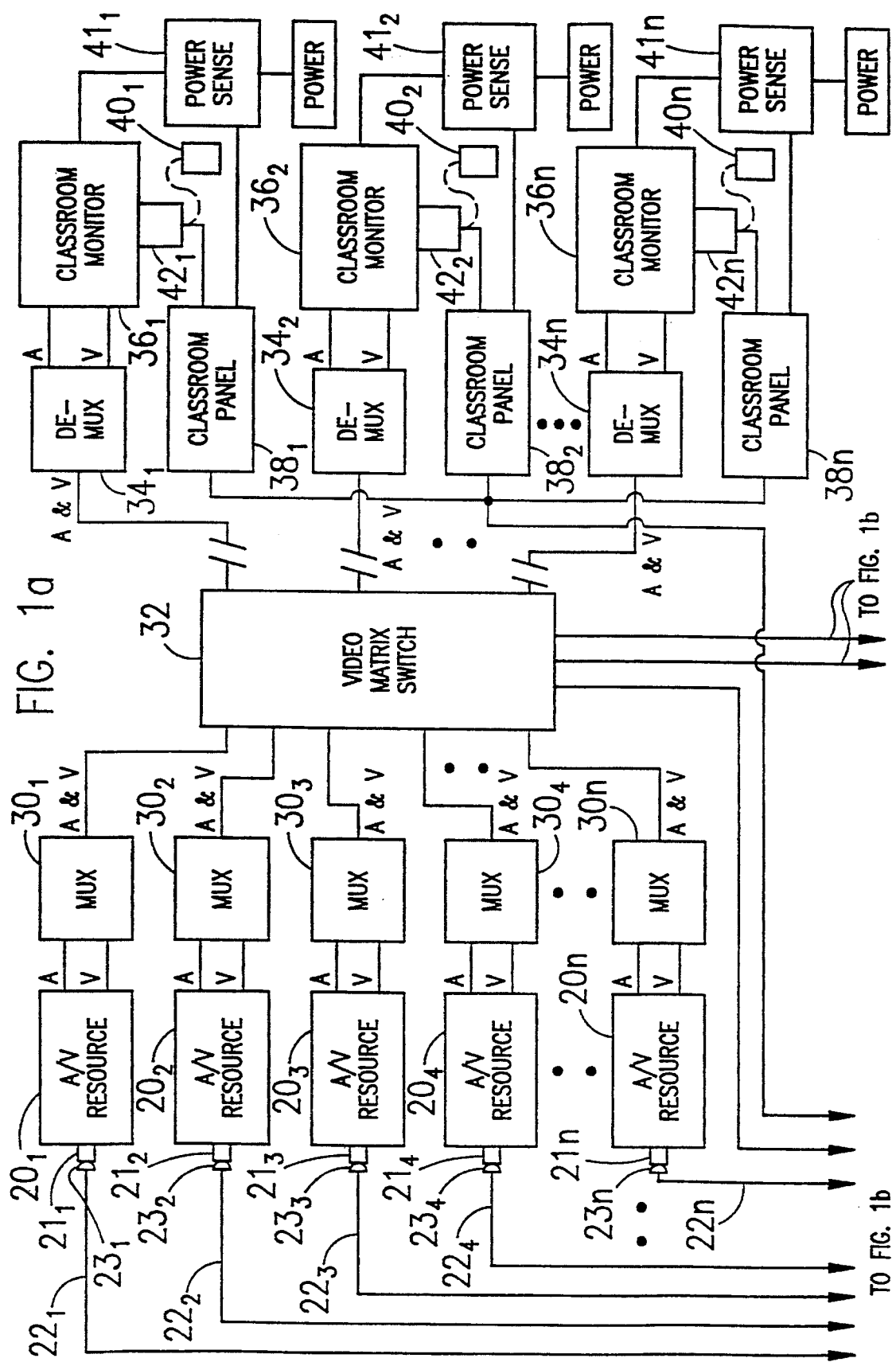

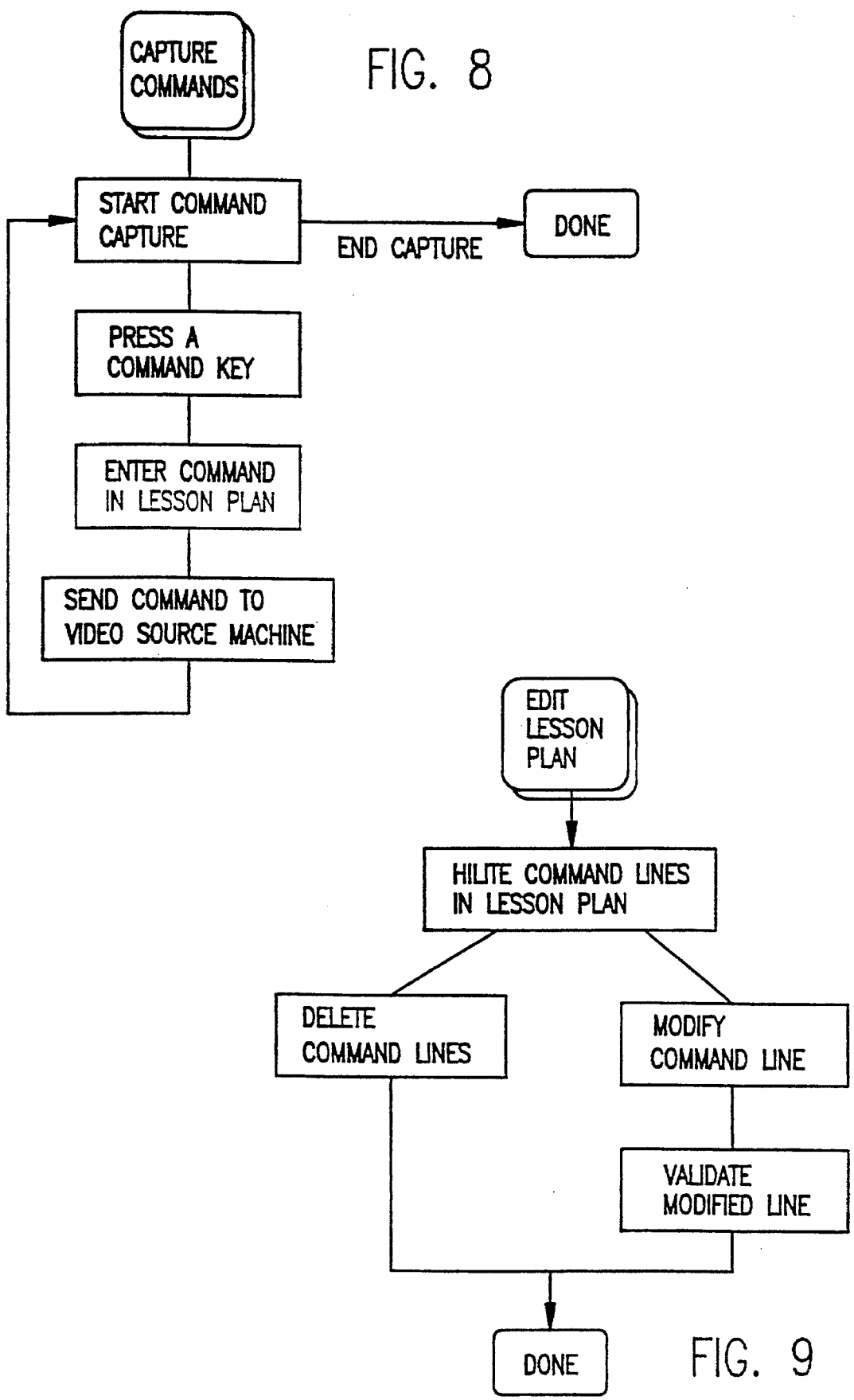

FIG. 14

COURSEWARE EDITOR — 100

CATALOG NUMBER: 363.739 CHE — 105  COPY NUM: 1
TITLE: CHEMISTRY: ACID RAIN: IN SEARCH OF SOLUTIONS
AUTHOR: ALLEGRO
SUBJECT: SCIENCE
AGE GROUP: 7TH AND 8TH GRADE
MEDIA: VHS
SUBTYPE: N/A
USERS: 1
☐ STEREO

KEYWORD1: ACID RAIN
KEYWORD2: B
KEYWORD3: V

ACID RAIN
  AERONAUTICS
  AIDS
  AIRPLANES
  ANTIBIOTICS
  ANTIQUITIES
  ARAB CIVILIZATION
  ARABS
— 102

DESCRIPTION: PROFILES CURRENT ...ING AND MEASURING ITS MOVEMENT
THROUGH THE ECOSYSTEM TO UNDERSTAND ITS ORIGINS AND EFFECTS.

MODIFIERS
FIND — 104
CLEAR — 103₁
NEW — 103₂
SAVE — 103₃
DELETE — 103₄
HELP
DONE

FIG. 15

COURSEWARE CATALOG

ENTRIES = 124

SORT BY: [MEDIA TYPE]

| MEDIA | TITLE | AUTHOR | CATALOG | SUBJECT | KEYWORD | | AGE GROUP |
|---|---|---|---|---|---|---|---|
| LASERDISC | FOOTSTEPS OF GIANTS | CARPENTER & ER | 629.2 FOO | SCIENCE | SPACE | OUTER- | 7TH AND 8TH,,R |
| LASERDISC | HEALTH: AIDS | ABC NEWS INTER | 616.97 HEA | HEALTH | KOOP | AIDS DISEAS | 7TH AND 8TH GR |
| LASERDISC | JUNK | X | CATALOG A | SUBJECT E | LUNKNO | | LUNKNOWN |
| LASERDISC | LASER DISC MACHINE | X | LASER1 | LUNKNOWN | LUNKNO | | 7TH AND 8TH GR |
| LASERDISC | LASER DUMSEY | SYSTEM | LASERDUMMY | LUNKNOWN | LUNKNO | | 7TH AND 8TH GR |
| LASERDISC | LOUVRE MUSEUM, THE | ODA | 750.74 LOU | SOCIAL ST | ART | PAINTI DRAWIN | 7TH AND 8TH GR |
| LASERDISC | MARTIN LUTHER KING, J | OPTICAL DATA C | 323 1 KIN | SOCIAL ST | BLACKS | CVIL KINN, | 7TH AND 8TH GR |
| LASERDISC | NATIONAL GALLERY OF A | VIDEODISC PUBL | 700.74 NAT | SOCIAL ST | ART | | 7TH AND 8TH GR |
| LASERDISC | NATIONAL GALLERY OF A | VIDEODISC PUBL | 700.74 NAT | SOCIAL ST | ART | | 7TH AND 8TH GR |
| LASERDISC | POWERS OF THE SUPREME | ABC NEWS INTER | 347 POW | SOCIAL ST | CONSTI | SUPREM | 7TH AND 8TH GR |
| LASERDISC | TEENAGESEXUALITY | ABC NEWS INTER | 612.66 TEE | HEALTH | SEX ED | | 7TH AND 8TH GR |
| LASERDISC | THE MIRACLE OF LIFE | NOVA\PBS | 9999.001 | HEALTH | FETAL | BIOLOG | 7TH AND 8TH GR |
| LASERDISC | THE WORLD OF CHARLES | LASER DISC CORP. | 384.8 EAM | SCIENCE | METRIC | MICRO | 7TH AND 8TH GR |
| LASERDISC | VIETNAM: THE 10,000 D | EMBASSY HOME E | 959.704 VIE | SOCIAL ST | UNITED | VIETNA 1961-1 | 7TH AND 8TH GR |
| LASERDISC | WAR AND PRESIDENTS | MR DITIP SING | 999.D | SOCIAL ST | PRESID | 123456 LESSON | 7TH AND 8TH GR |
| LASERDISC | WAR AND PRESIDENTS | MR DITIP SING | 999.D | SOCIAL ST | PRESID | 123456 LESSON | 7TH AND 8TH GR |
| LESSON P1 | LESSON.LP | VENUGOPAL REDD | 9876.5432 | LESSON PL | LESSON | PLAN | AGE GROUP 1 |
| LESSON P1 | ONE.LP | VENUGOPAL REDD | TEXT.1.LP | LESSON PL | ONE | | AGE GROUP 3 |
| LESSON P1 | THREE.LP | VENU REDDY | TEST.3.LP | LESSON PL | THREE | | 7TH AND 8TH GR |
| LESSON P1 | TWO.LP | VENU REDDY | TEST.2.LP | LESSON PL | TWO | | AGE GROUP 1 |
| LESSON P1 | VENU.LP | BOVENUKO | 1-1-5 | SOCIAL S1 | DRUG S | | AGE GROUP 3 |
| PC VIDEO | CD-ROM RESERVE | X | CD-ROM | LUNKNOWN | LUNKNO | | LUNKNOWN |
| VHS | STEPS TO BETTER WRIT | GASTON AND PAR | 808.4 GAS | LANGUAGE | ENGLIS | PHETOR | 7TH AND 8TH GR |
| VHS | ACROSS FIVE APRILS | RANDOM HOUSE V | F ACR | LANGUAGE | UNITED | | 7TH AND 8TH GR |
| VHS | AGATHA CHRISTIE-HO | MORGAN, JANET | 92 CHA | LANGUAGE | CHRIST | | 7TH AND 8TH GR |
| VHS | ARAB WORLD, THE | KNOWLEDGE UNK | 956 ARA | SOCIAL ST | ARABS | ARAB C | 7TH AND 8TH GR |

☐ SHOW PAST EVENTS

[PRINT CATALOG] [SCHEDULE RECORD] [FULL RECORD] [PLANNED USAGE] [HELP] [DONE]

APPARATUS AND METHOD FOR GENERATING AND PRESENTING AN AUDIOVISUAL LESSON PLAN

This is a continuation of copending application Ser. No. 08/040,468, filed on Apr. 1, 1993, now U.S. Pat. No. 5,385,475.

FIELD OF THE INVENTION

The present invention relates generally to the presentation of audiovisual material, and more particularly to a system and method for generating and executing a lesson plan data file for sequentially presenting one or more selected portions of audiovisual materials.

BACKGROUND OF THE INVENTION

In the educational environment, teachers frequently organize a prepared lesson plan prior to the presentation of a lesson to the students. The lesson plan is essentially a prearranged strategy for imparting information to the students. In modernized classrooms, instructors often present the information with the assistance of audiovisual aids such as audiodiscs, videodiscs, videotapes, slides, overhead projectors, and the like. Ordinarily, personnel from a central audiovisual department transport the necessary hardware (monitors, speakers, etc.) and the prerecorded audio or visual materials to the classrooms as needed. Depending on the various formats that the information is recorded on, (i.e. videotape, videodisc, etc.) at least one machine capable of playing each desired format must also be brought to the room.

It can be readily appreciated that frequent transporting of such equipment is generally inconvenient; more significantly, such activity produces considerable wear and tear on the machines. Accordingly, centralized location of the machines is desirable and has become commonplace in many schools. By permanently wiring the various rooms with audio speakers and video monitors, and/or standard televisions, and connecting those units to a central location, the physical transportation of the media playing machines has become unnecessary. Indeed, by further including a control panel in each audiovisually-equipped classroom, the teacher can even control the playing of the machines. However, since most schools have a limited supply of playing machines and prerecorded media, some scheduling is necessary to ensure that two or more teachers are not planning to present material that cannot be executed, either because the desired media is not available or because all of the necessary type of playing machines for that media are already scheduled at the desired time.

As a result, computerized scheduling systems have been developed to organize the scheduling of machines and materials. However, with these systems only the scheduling is accomplished, and thus teachers must independently search for materials to be presented.

Moreover, these centrally located systems are designed to present only one tape or the like per class period. While theoretically multiple media might be presented, the flexibility of the material presented would be severely limited. For example, a teacher might schedule a tape for the first fifteen minutes, a five minute discussion, and a videodisc for the remainder of the class. With remote control capabilities, the teacher might then play the tape and present portions of the videodisc. During the five minute discussion, the audiovisual staff would have to disconnect the videotape player before connecting the videodisc player to the room. Furthermore, since the teacher is responsible for all playback operation, timing, and so on, unless an assistant is available the teacher becomes preoccupied with running the equipment instead of teaching the class. Realistically, scheduling the playback of more than three types of media in an hour-long class period would be impractical.

Additionally, no means are provided for automatically editing out undesirable portions of the materials while including only selected material. Thus, the teacher is forced to either present extraneous materials to students or manually control the playback apparatus, for example to advance a videodisc to predetermined frames.

Accordingly, teachers are severely limited in the diversity of materials presented, since each playback machine must be manually operated by the teacher. For example, the teacher has to manually fast forward or rewind tapes to certain visually recognized positions, manually move around a single videodisc to predefined starting and stopping points, and so on. Although U.S. Pat. No. 5,109,482 discloses a computer driven videodisc player that allows selected frames of a videodisc to be accessed and displayed in a predetermined order, no means are provided for interweaving multiple media displays into a single presentation. Thus, presenting only selected segments of multiple media still requires significant coordination and timing on the part of both the teacher and the audiovisual personnel. All of this reduces the amount of time that the teacher can spend answering questions, introducing upcoming materials, and otherwise teaching the class.

Finally, nothing is presently available to assist teachers in determining what media are appropriate for presentation. While the available media might be listed in a database containing tables of contents, brief written synapses and the like, and searched by subject, keywords, and the like, the teachers still have to separately obtain and preview the materials to determine their relevance.

OBJECTS AND SUMMARY OF THE INVENTION

Accordingly, it is an object of the present invention to provide a system and method for generating a lesson plan that automatically controls the presentation of predetermined portions of audiovisual material from a number of sources.

It is another object of the invention to provide a system and method for generating a lesson plan that sequentially plays portions of audiovisual materials presented from at least one audiovisual resource.

A more detailed object of the invention is to provide a simple lesson plan generation program that coordinates with a scheduling system to automatically verify the availability of the media and correspondingly required playback apparatuses at a desired presentation time.

It is another object of the invention to provide a system wherein users can select presentation material from a courseware database that is integrated with the lesson plan generation program and the scheduling system.

It is yet another object of the invention to provide a system and method wherein only certain user-selected segments of the materials selected for presentation are automatically presented in a programmed order predefined by the user.

It is still another object of the invention to allow the user to remotely control the presentation in simple discrete step commands.

Briefly, there is provided a system and method for connecting audiovisual output signals from audiovisual resources to monitors in accordance with a predetermined sequence called a "lesson plan." The system comprises a storage medium, and means for inputting a lesson plan to the storage medium. The lesson plan includes labels for identifying selected ones of the audiovisual resources and control commands for the selected audiovisual resources, wherein each of the control commands is associated with one of the labels.

A processor interprets the lesson plan in the storage medium and distinguishes between identifying labels and control commands. As a result, the processor provides first output signals in response to the identifying labels and second output signals in response to the control commands. A switching network responsive to the first output signals from the processor connects the outputs of one of the audiovisual resources to the monitor in the predetermined sequence as defined by the lesson plan and a driver responsive to the second output signals from the processor controls the operation of the connected audiovisual resource in the predetermined sequence as defined by the lesson plan.

Such a system, known as the Ranger™ is available from Rauland-Borg Corporation, 3450 W. Oakton, Skokie, Ill., and allows media loaded into any number of audiovisual resources to be remotely presented from the appropriate playback machines to one or more monitors in accordance with a predetermined sequence.

The system further provides a workstation computer system which executes a software program for facilitating the generation of such lesson plans. During program execution, the available labels for identifying selected ones of the audiovisual resources and the available control commands for the selected audiovisual resources are displayed as corresponding images on a screen. A conventional point-and-click procedure inputs the selected identifying labels and control commands to the workstation memory for sequential assembly into a lesson plan. The program further enables editing and previewing of the lesson plan in memory. Once in the desired order, the memory contents are saved to a lesson plan data file, for later retrieval for a classroom presentation.

In the preferred embodiment, the system includes a scheduling means and a database of all available media. This further assists with the generation and the presentation of the lesson plan.

Other objects and advantages will become apparent from the following detailed description when taken in conjunction with the drawings, in which:

BRIEF DESCRIPTION OF THE DRAWINGS

FIGS. 1a and 1b illustrate a block diagram of the hardware components of the preferred embodiment of the system;

FIG. 8 is a flow diagram illustrating the steps for recording commands into the workstation memory for the lesson plan command file;

FIG. 9 is a flow diagram illustrating the steps for editing commands in the workstation memory;

FIG. 14–15 are pictorial representations of video screens which appear during the database search for materials to utilize in a lesson plan; and FIGS. 16–19 are pictorial representations of video screens which appear during the scheduling of a lesson plan.

Figure 1B:
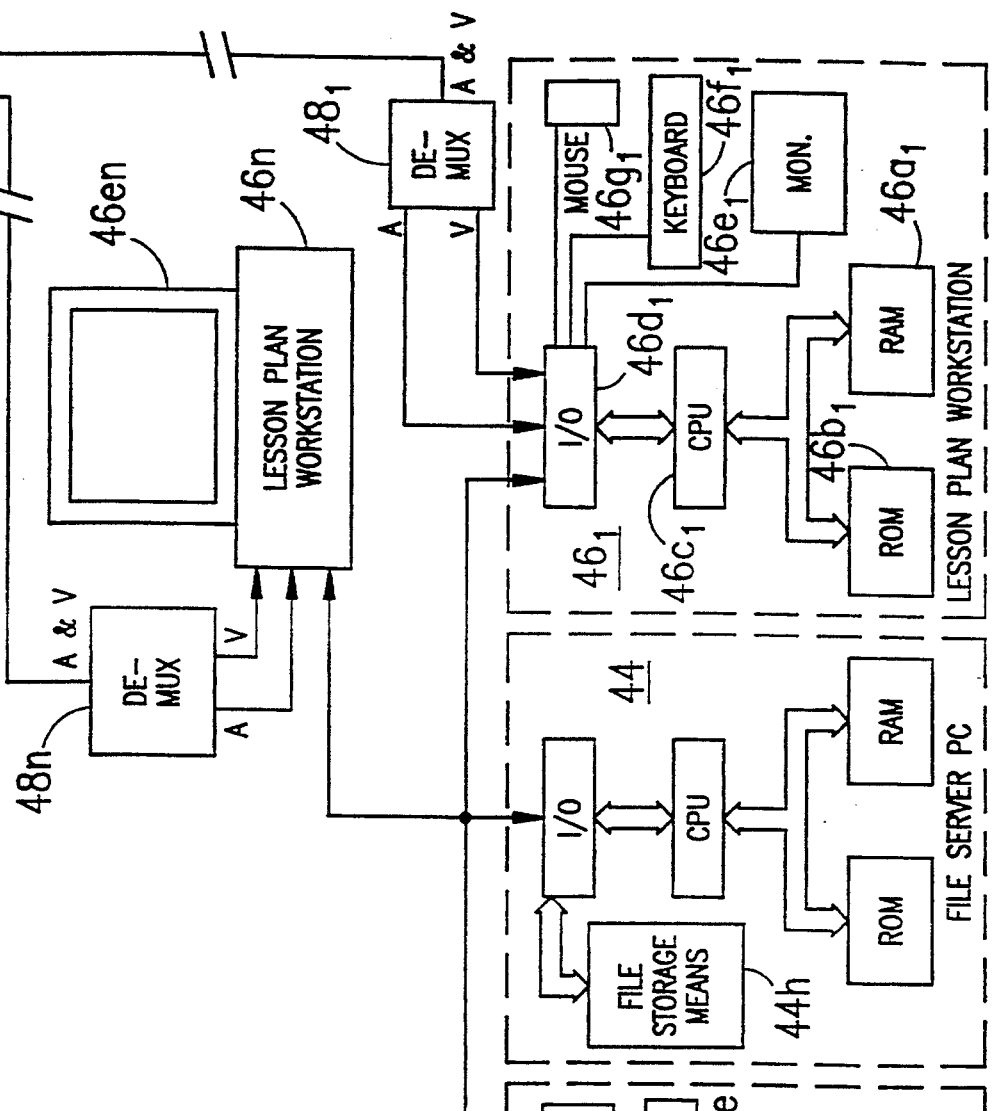

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE PREFERRED EMBODIMENTS

I. The Hardware and System Overview

Turning now to the drawings and referring first to FIGS. 1a and 1b, there is shown a block diagram of the overall system. A number of audiovisual resources $20_1$–$20_n$ (including potentially both live broadcasting devices and playback apparatuses for prerecorded media such as videodisc players, VCRs, and the like) are connected through individual device control lines $22_1$–$22_{22n}$ to a system controller 24. The system controller 24 is essentially a computer including a random access memory (RAM) (i.e., storage medium) 24a, read only memory (ROM) 24b, processor (CPU) 24c, input-output means (I/O) 24d, and so on. The system controller 24 executes a program that electronically operates the available functions of the audiovisual resources $20_1$–$20_n$ and controls the connection of output signals from the resources $20_1$–$20_n$ to one or more destinations. These operations and connections are frequently performed in a master-slave type of arrangement in accordance with data commands transmitted from a Media Center personal computer (PC) 26. For example, the Media Center personal computer (PC) 26 might send data to command the system controller 24 to turn-on (power) resource $20_1$, play the media (for example a videodisc) presently in resource $20_3$, and so on. Although any programmable electronic controller having sufficient speed, processing power, memory and I/O functions could operate as the system controller 24, the preferred embodiment employs a control system commercially available from AMX Control Systems Inc. One such controller comprises AXCESS™ components, including an AXF-S card-cage, AXC-EM enhanced system monitor, AXC-232 RS232/422 interface cards and an AXC-IR/s infrared transmitters.

Preferably, the audiovisual resources $20_1$–$20_n$ are equipped with infrared receivers $21_1$–$21_n$ for receiving control commands. Accordingly, the system controller 24 includes a driver within its I/O means 24d that controls the resources $20_1$–$20_n$ by driving LEDs $23_1$–$23_n$ to provide the necessary infrared control signal outputs. Generally, each LED $23_1$–$23_n$ is driven through connections $22_1$–$22_n$ and physically coupled to the infrared receivers $21_1$–$21_n$ of the corresponding resources $20_1$–$20_n$. This allows operational control of each resource $20_1$–$20_n$ without allowing infrared signals to be detected by a receiver of another resource. While this provides a simple and reliable control mechanism, other methods of controlling the resources $20_1$–$20_n$ are feasible. For example, certain resources such as videodisc players are equipped with a serial data port (RS-232) specifically for remote operational control. Accordingly, the system controller 24 can utilize this serial port (not shown) to control the operation of such a resource. Alternatively, direct hard-wire connections could also be utilized to control the resources $20_1$–$20_n$, however such a scheme is generally undesirable in that it requires internal modifications of commercially available hardware.

The preferred system controller 24 is constructed and arranged to receive and store in its RAM 24a and/or immediately execute serially transmitted device control commands via a data line 28 connected to a serial port included in the Media Center PC's input-output means 26d. Nevertheless, it should be understood that virtually any conceivable method of transmitting control information (for example, via a parallel interface) would accomplish an equivalent result.

Although not necessary to the invention, in the preferred embodiment the audio and video output signals from the resources $20_1$–$20_n$ are first multiplexed onto a common wire unique to each resource by multiplexers $30_1$–$30_n$. The signal multiplexing allows a switching network such as a simple video matrix switch 32 to connect the output from a number of the various resources to one or more demultiplexers $34_1$–$34_n$ and ultimately to classroom monitors $36_1$–$36_n$, or workstation monitors $46e_1$–$46e_n$. One such video switching matrix 32 is an AVS 1-B video-only matrix switch, commercially available from Utah Scientific Inc. These switches are available in a large variation of card-cage sizes and crosspoint (e.g. 8×24) and output card configurations.

For simplicity, as illustrated each of the classroom monitors $36_1$–$36_n$ is intended to include a display screen, audio speakers, and appropriate amplification means, such as in a standard television set. However it can be readily appreciated that in one or more classrooms it is essentially equivalent to separate the video display screens of the monitors from the audio speakers and/or audio amplifiers of the monitors. In any case, since the classroom monitors $36_1$–$36_n$ are ordinarily remotely located, it is also desirable to locate the demultiplexers $34_1$–$34_n$ remotely, thereby reducing the total number of wires necessary for carrying the signals to the remote locations.

It can also be readily appreciated that a more complex audiovideo matrix switch (not shown) that is capable of independently switching both the audio and video signals is equivalent, and would eliminate the need for signal multiplexing. Similarly, instead of the baseband system described herein, a broadband system can alternatively be implemented by adding an RF channel modulator and channel combiner to the system. With proper modulation, the output signals from the resources are thus made available on individual VHF, UHF or standard Cable frequencies so that a single common cable (for example a 75 ohm cable) can carry the output signals for all of the resources. These resources are then selected by tuning a conventional television set to the appropriate channel.

In any case, the system controller 24 also controls the signal connections from the appropriate resources $20_1$–$20_n$ to the appropriate classroom monitors $36_1$–$36_n$. In accordance with one aspect of the invention, these connections are accomplished in dependence on data commands received from the Media Center PC 26, again preferably through the serial data line 28. Thus, for example, the Media Center PC 26 might transmit to the system controller 24 commands which, as they are executed, will direct the video matrix switch 32 to connect the signals from resource $20_4$ to the classroom monitors $36_1$ and $36_2$, while connecting the signals output by resource $20_1$ to classroom monitor $36_n$. Of course, the signals may first be multiplexed and later demultiplexed as described hereinbefore.

Within each of the remotely located classrooms is a classroom panel (i.e., a keypad with a display screen) $38_1$–$38_n$. The classroom panels $38_1$–$38_n$ are connected to the system controller 24. Preferably, the classroom panels are all looped together on a common RS-485 serial line such that only one serial connection to the system controller 24 is necessary. Nevertheless, other methods of connecting the classroom panels to the system controller 24 (such as direct wiring) are feasible.

The classroom panels $38_1$–$38_n$ allow the teacher to override commands that the system controller 24 would otherwise be ordered to execute in accordance with the data received from the Media Center PC 26. Accordingly, the program executed in the system controller 24 must continuously scan its input ports for signals (not shown) and/or handle interrupts resulting from potential override commands. For example, the Media Center PC 26 might have provided the commands necessary to play the media in audiovisual resource $20_2$ at a certain time and connect the output signal to classroom monitor $36_1$. However, the teacher might instead command the system controller 24 to pause the playback until further notice by actuating an appropriate switch on the classroom panel $38_1$. If the override commands correspond to a sequentially executing lesson plan, the system controller 24 passes the request to the Media Center PC 26 so that subsequent lesson plan commands can be appropriately modified. In this way the commands previously scheduled for execution can be delayed, edited, repeated, and so on.

Although not necessary to the invention, the system controller 24 is also capable of connecting audiovisual resources $20_1$–$20_n$ to the classroom monitors $36_1$–$36_n$ such that only the appropriate classroom panel (i.e., not the Media Center PC 26) will provide all subsequent audiovisual resource control commands. In such a case, the system controller 24 executes the commands directly from the classroom panels $38_1$–$38_n$ rather than passing the commands to the Media Center PC 26.

Figure 4:
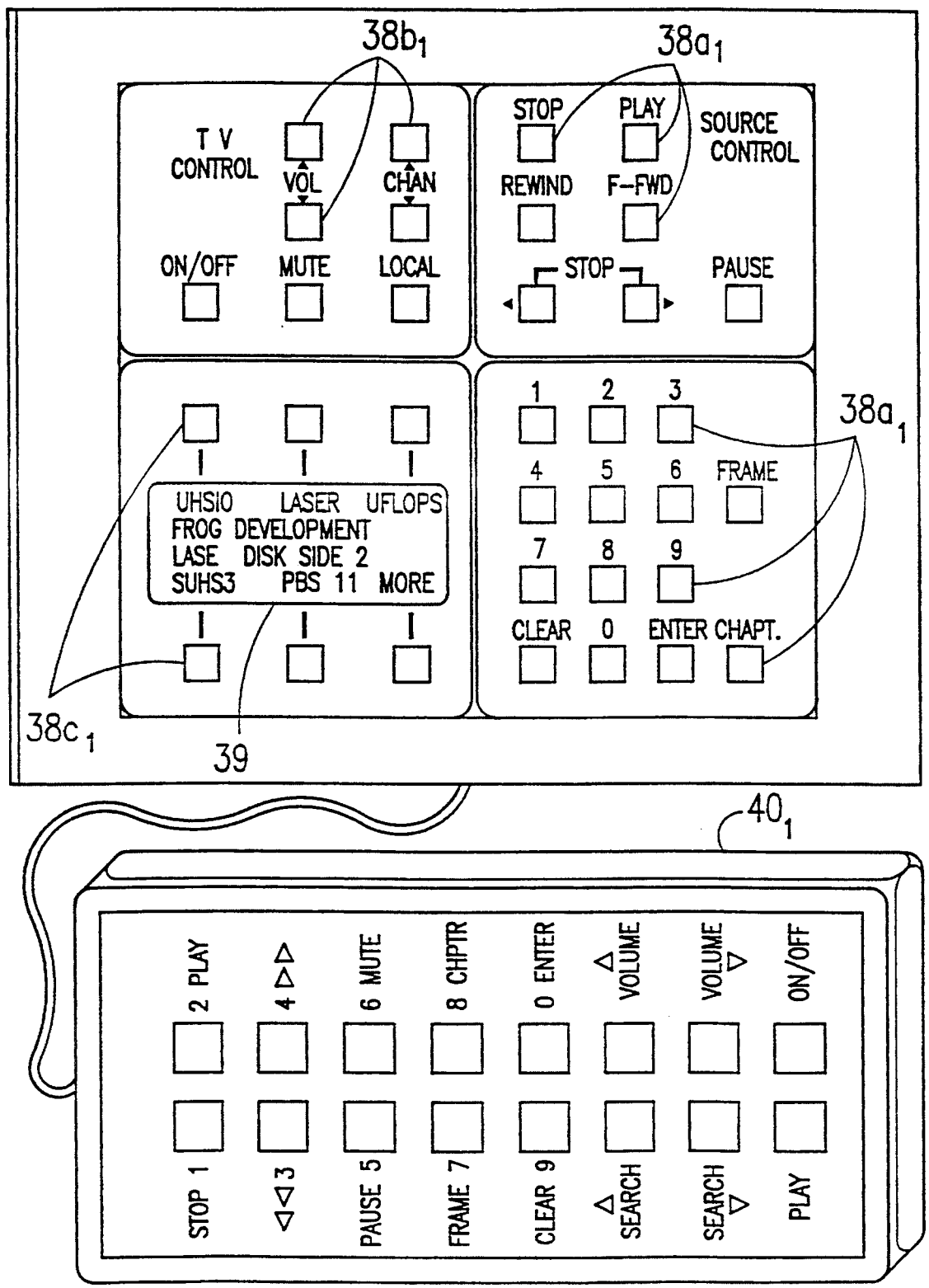
FIG. 4 is a representation of a classroom panel keypad and corresponding remote control device.

FIG. 4 shows one such classroom panel in detail. The classroom panel switches (for example on classroom panel $38_1$) are preferably simple contact type switches, and correspond to the functions available in most types of audiovisual playback resources. Thus, the function switches $38a_1$ preferably correspond to commands such as "Play," "Stop," and the like. Additionally, a number of monitor control switches $38b_1$ are included which operate the classroom monitor and/or associated speakers, such as "Channel," "Volume Up," and so on. As a result, the connection from the classroom panels $38_1$–$38_n$ to the system controller 24 further allows the Media Center PC 26 to remotely control the monitors $36_1$–$36_n$ via commands to the system controller 24. Moreover, a "Local" switch is available for toggling between the video signals transmitted from the centrally located system and an optional "local" audiovisual source which may be present in the room. Additionally, a number of switches $38c_1$ are available for selecting among the playback resources that are reserved for the classroom presentation as described in more detail hereinbelow. These switches $38c_1$ correspond to a menu provided on a display screen 39.

Preferably, an audible tone (i.e., beep) is produced in the classroom panels $38_1$–$38_n$ whenever a switch is actuated. This tone confirms successful actuation of a key, and is produced for a length of time individually programmable by the user at each classroom panel $38_1$.

In the preferred embodiment, some of the resource function switches $38a_1$–$38a_n$ and monitor control switches $38b_1$–$38b_n$ present on the classroom panels $38_1$–$38_n$ are replicated in a hand-held remote control devices $40_1$–$40_n$. Thus, the remote control device $40_1$ of FIG. 4 is similarly equipped with a number of switches corresponding to "Play," "Stop," and the like. These classroom panels $38_1$–$38_n$ and/or hand-held remote control devices $40_1$–$40_n$ thus enable communication from the remote classroom back to the system controller 24 and ultimately to the Media Center PC 26 if necessary.

The hand-held remote control devices $40_1$–$40_n$ ordinarily are constructed to transmit infrared signals when actuated. The signals are detected at receivers $42_1$–$42_n$ present at or near the classroom monitors $36_1$–$36_n$ and converted to electrical signals which are in turn transmitted to the classroom panels $38_1$–$38_n$. Alternatively, the signals could be received directly at the classroom panels $38_1$–$38_n$ or at some other location, however it is preferable to locate the receivers $42_1$–$42_n$ at the classroom video monitors $36_1$–$36_n$, since persons employing the hand-held remote control devices have a tendency to aim them at the location where the visual feedback occurs, and because the monitors themselves are typically capable of receiving related infrared commands. Ordinarily, the hand-held remote control devices $40_1$–$40_n$ are interchangeable, that is, any hand-held remote device will operate with any classroom panel. However, at least some of the hand-held remote control devices can be designed so as to function only with certain classroom panels thus reducing any motivation to remove such hand-held devices from the rooms. Furthermore, although remote control devices utilizing infrared frequencies are sufficient for most classroom environments, other environments require devices capable of transmitting the signals over large distances. Accordingly, radio frequency (RF) remote control devices are available for larger areas such as auditoriums, lecture halls, and so on. Again, it is preferable to locate the signal receivers near the video monitors, although other locations for the signal receivers are feasible.

Although not necessary to the invention, in the preferred embodiment sensing means $41_1$–$41_n$ (see FIG. 1b) such as means for sensing power are also connected to the system controller 24 through the classroom panels $38_1$–$38_n$ from the remotely located classroom monitors $36_1$–$36_n$. Each sensing means $41_1$–$41_n$ is connected through input ports on the system controller 24 to the Media Center PC 24, to provide a monitor status signal. For example, if an apparatus is disconnected (unplugged) from a power source the system is immediately aware of the condition and can take appropriate action such as sounding an alarm.

Additionally, the sensing means $41_1$–$41_n$ are utilized to determine if a monitor is either switched off or switched on. Since monitors often have a single on/off toggle switch, this enables the system controller to ensure that the monitor is in the proper on or off state when desired, that is, that it does not supply a "toggle power" command that turns off the monitor power when it should be turning it on, or vice versa. As a result, the system controller 24 can ensure the proper powering up any or all monitors, for example during an emergency video message to classrooms. Similarly, the system controller can power down any or all monitors such as after closing hours to conserve energy and preserve monitor operating life.

In accordance with one aspect of the invention, the Media Center PC 26 executes a real-time software program (attached as Appendix B, volumes I–IV) that reads a predefined lesson plan file to provide the system controller 24 with data necessary to control the connection of the video sources to the classroom monitors $36_1$–$36_n$ and/or workstation computers $46_1$–$46_n$, and to control the functions performed by the audiovisual resources $20_1$–$20_n$ as previously described. The program executed by the Media Center PC 26 also provides a visual display output on its monitor 26e indicating a schedule for loading (or unloading) media into the appropriate audiovisual playback resource. For example, resource $20_3$ might be a videodisc player and require that videodisc number LD321456 be loaded for playback to classroom monitor $36_2$ at 10:45 am on October 6 (of the current year). Accordingly, on October 6th the monitor 26e would indicate that the videodisc LD321456 should be loaded into playback resource $20_3$ (or a similar name or number corresponding thereto) prior to 10:45 am. Thus, assuming proper loading by the audiovisual department personnel at or before the appropriate time, the software program executing in the Media Center PC 26 will transmit data information to the system controller 24 for activating the playback of resource $20_3$ and operating video matrix switch 32 to connect the audio and video signals (multiplexed) from resource $20_3$ to classroom monitor $36_2$ (demultiplexed).

Since the media center PC 26 includes a keyboard 26f and a mouse 26g, commands can be entered to directly cause the system controller 24 to control the operation of the audiovisual resources $20_1$–$20_n$ and video matrix switch 32. More importantly, the software program executed by the Media Center PC 26 is adapted to read in one or more previously developed lesson plan data files which contain predetermined command sequences including identifying labels for the audiovisual resources for connecting their output signals to the appropriate classrooms and control commands for operating the connected resources. Because of this feature, teachers or others can develop lesson plans in advance that will cause the system controller 24 (via commands transmitted from the media center PC 26) to automatically execute the functions and switching necessary to play one or more audiovisual works on a certain classroom monitor or workstation monitor at a certain predetermined time.

Figure 2A:
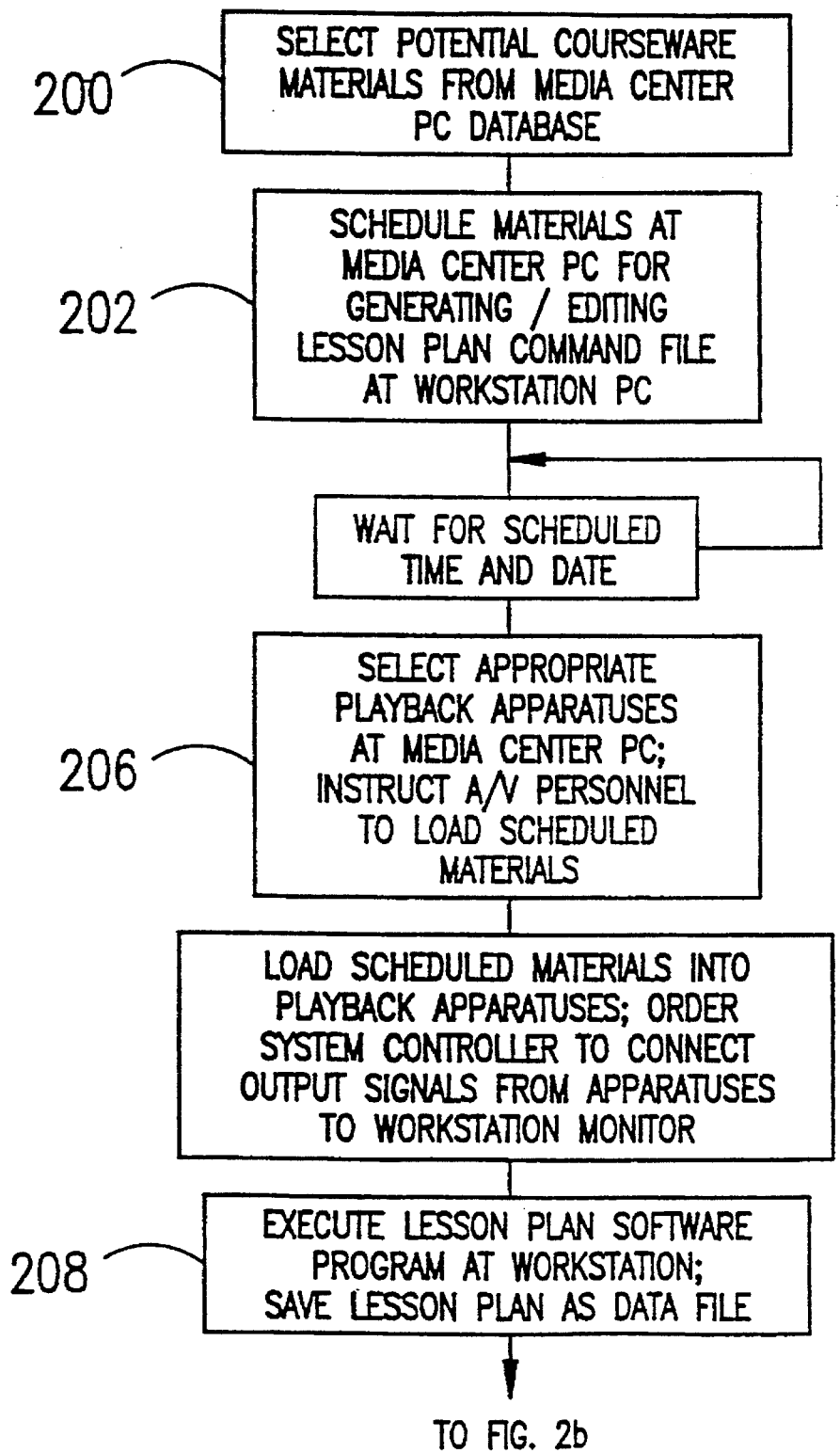
FIGS. 2a and 2b are flow diagrams illustrating the operational and data flow through the system.
Figure 2B:
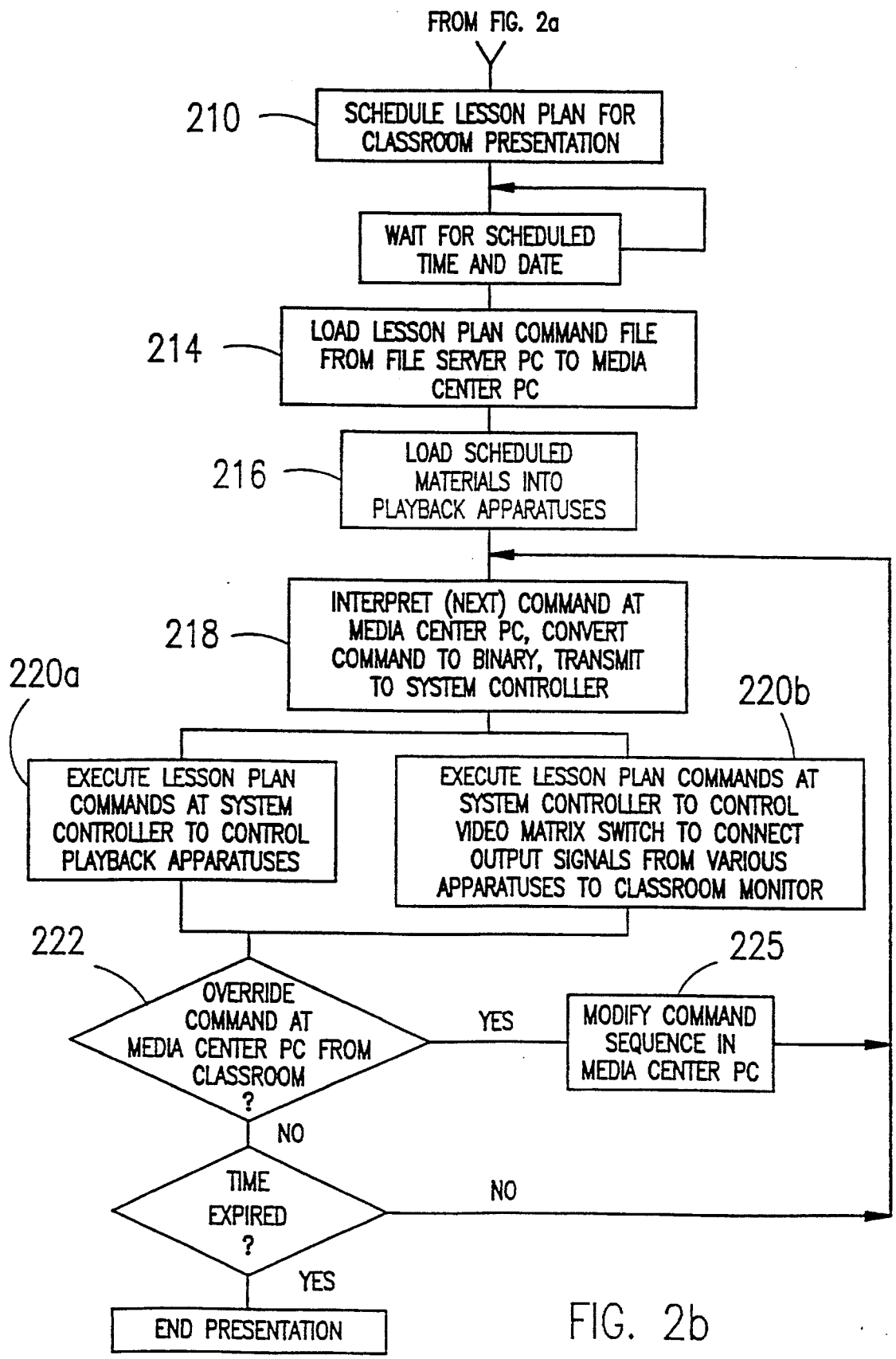

In general, an author (such as a teacher) conceives such an audiovisual lesson plan, reduces it to a lesson plan data file on one of the workstation computers $46_1$–$46_n$ and ultimately presents it to a classroom in accordance with the steps shown in FIGS. 2a and 2b. For ease of understanding herein, the author of such a file will be referred to as the teacher, although it is to be understood that the teacher need not personally create the lesson plan command file. First, as shown in step 200, the teacher selects audiovisual media (i.e., courseware) for possible inclusion in the audiovisual presentation. To assist with the selection, in the preferred embodiment of the invention the Media Center PC 26 additionally provides a database of all courseware available for the presentation. Nevertheless, other methods of selecting courseware, from printed lists, books, and the like, and even from the teacher's personal knowledge, are equally acceptable.

Regardless of how selected, as shown in step 202 the teacher then schedules the courseware at the Media Center PC 26 for access at a workstation such as the workstation 461 to ensure their availability at a specified future time. Again, although not necessary to the invention, the program executed by the Media Center PC 26 also handles the necessary scheduling functions, described in detail hereinbelow. Scheduling ensures that 1) a single copy of pre-recorded media is not scheduled to be loaded into two machines simultaneously, 2) a playback machine is available for each requested media and 3) classroom monitors or workstation computers are not scheduled to receive different signals at the same time. Thus, the media center PC 26 must also contain or otherwise have access to a database of all media, playback machines, and classroom or workstation monitor locations.

As shown in step 206, at the scheduled time the Media Center PC 26 instructs audiovisual personnel to load the scheduled courseware materials into appropriate playback apparatuses selected by the Media Center PC 26. Preferably, the media center PC 26 evenly allocates the usage of similar type playback apparatuses, for example so that the same videodisc player is not always operated while other identical videodisc players remain idle. The media center PC 26 also transmits information to the system controller 24 so that the video output signals from the selected playback apparatuses are made available to the appropriate workstation computer (for example workstation $46_1$). These signals are switched to the workstation monitor $46g_1$ in accordance with the teacher's requests via electronic instructions from the workstation PC 26 to the system controller 24.

In accordance with the invention, as shown in step 208 the teacher then begins to assemble in the workstation random access memory (RAM) 46a lesson plan data commands for controlling the playback apparatuses and video matrix switch 32 such that selected portions of the courseware materials from any number of audiovisual resources will ultimately be presented to a classroom in a predetermined sequential order. Once assembled as desired, these data commands are saved to a data file under a unique identifying filename, and preferably stored in a file server PC 44 at file storage means 44h, i.e., non-volatile storage medium, (see FIG. 1b). Generally, these data files are known as lesson plans, and are therefore typically saved with an ".LP" filename extension. Essentially, the lesson plan data is thereby saved for a classroom presentation at a later date and time.

Figure 3:
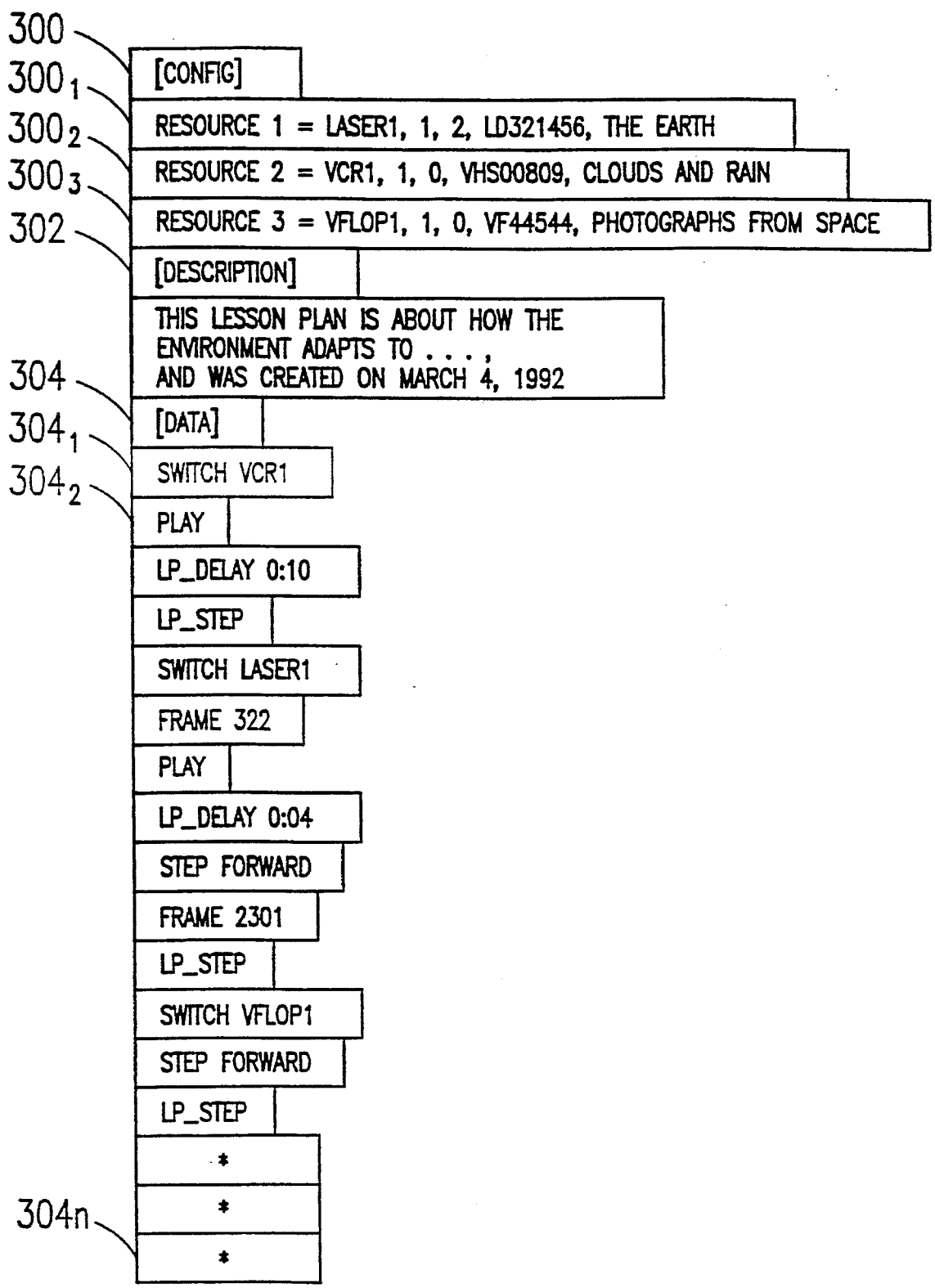
FIG. 3 is a diagram illustrating the lesson plan data structure in memory storage according to the invention.

FIG. 3 illustrates how one such lesson plan is structured. Initially, the lesson plan data is structured to contain configuration information identifying the media chosen for the classroom presentation. This enables the Media Center PC 26 to assign the chosen media to appropriate playback apparatuses $20_1$–$20_n$ prior to the time of the classroom presentation. Thus, FIG. 3 shows that in a certain memory location $300_1$, a first videodisc player, LASER1, will be loaded with videodisc number LD321456. Additional information is provided in previous fields separated by commas, such as loading information (Side 2). Finally, the title of the medium for example, "The Earth" is provided to simplify identification by the teacher. Similarly, data in memory locations $300_2$ and $300_3$, corresponding to a first VCR and a first video floppy disk player respectively, are assigned to appropriate courseware materials. Preferably, a description memory section 302 follows, starting immediately after the configuration section, for storing textual information as described below.

In any case, after the configuration and description sections, memory section 304 contains data commands to be sequentially executed by the system controller during the classroom presentation. In the present example, memory location $304_1$ contains a data label command identifying which playback apparatus should have its output signals switched to the scheduled monitor. Thus, in the example shown in FIG. 3, VCR1, a videocassette recorder/player, will first have its output switched to the monitor, since memory location $304_1$ contains a "SWITCH VCR1" label command. Additionally, this identifying label data command identifies the playback apparatus that subsequent data commands will be directed to, until a different audiovisual resource (playback apparatus) is designated. Accordingly, memory location $304_2$ contains a "PLAY" command which will be directed at VCR1 when executed. Subsequent commands will be executed in a like manner as described below.

All of the data is preferably stored in an ASCII format in contiguous bytes, and separated by field separators such as carriage returns and/or line feeds. Nevertheless, other storage methods, such as those utilizing memory mapping techniques, are feasible.

Returning to FIGS. 2a and 2b, once a lesson plan is developed and stored, to present such a lesson plan to a classroom, at step 210 the teacher subsequently schedules the presentation of the plan in the Media Center PC 26 for playback at a predetermined time and date, as described in detail below. This scheduling, similar to the scheduling described previously for reserving potential courseware materials, ensures that there is no conflict with another such creation or presentation of a lesson plan, in other words, to ensure that both the media (courseware) and an appropriate audiovisual playback resource are available at the scheduled date and time. Additionally, scheduling ensures that the classroom requested for the presentation is available.

As shown in step 214, prior to the scheduled presentation time the Media Center PC 26 retrieves the file from the file server PC 44, determines the necessary courseware from the configuration section, and in step 216 instructs audiovisual personnel to load the scheduled courseware materials into appropriate playback apparatuses selected by the Media Center PC 26.

As shown in step 218, the media center PC 26 then begins to read the data commands from the lesson plan file, convert the commands to a binary format, and transmit this information to the system controller 24. The system controller 24 interprets and executes these commands so that the system controller 24 properly controls the resource (step 220a) or so that the video matrix switch 32 connects the appropriate audiovisual resource to the scheduled classroom (step 220b).

Throughout the interpretation and execution of the data commands in steps 218–220, the system controller 24 in communication with the Media Center PC 26 also scans for override commands (step 222) from the classroom panel (such as 38₁) or corresponding handheld remote control (such as 40₁). If such an override command is detected, the Media Center PC 26 takes appropriate action and modifies (step 225) the otherwise sequential transmission of commands to the system controller 24. For example, the teacher might interrupt the commands with a pause request until a future command instructs the system to resume. This interpretation and execution process thus continues until the scheduled presentation time expires. Accordingly, even if the lesson plan data commands are exhausted, the system allows the teacher to replay or otherwise control the reserved media during the reserved time.

Because the media center PC 26 must perform so many functions, the media center PC 26 must possess sufficient speed, processing power, storage capability, and so on. Accordingly, in the preferred embodiment it comprises at least a 486 microprocessor running at 50 megahertz, with 4 megabytes of RAM, a 100 megabyte hard disk, and super video graphics array capabilities. Additionally, a mouse, floppy disk drive and sufficient serial and parallel input/output ports are provided.

As shown in FIG. 1b, for storing the lesson plans, a file server PC 44 including file storage means 44h (such as a hard disk) is ordinarily connected to the media center PC 26. The file server PC 44 stores a number of these lesson plan command data files which can be executed by the system controller 24 via the media center PC 26. Although a single file server PC 44 could be utilized to both store and execute a program to generate such files, the file server computer 44 is preferably connected to a number of lesson plan workstations $46_1$–$46_n$, each having RAM 46a, ROM 46b, CPU 46c, I/O means 46d, a monitor 46e, a keyboard 46f and a mouse 46g. The workstations $46_1$–$46_n$ are preferably arranged in a local area network configuration with the file server PC 44 and the Media Center PC 26, and preferably execute the software program that facilitates the creation of these files which contain the command sequences. Since these sequences ordinarily correspond to a later performance of an audiovisual lesson plan, this command-sequence-generating software program is generally referred to as lesson plan software.

It can readily be appreciated that although in the preferred embodiment a number of computers are utilized for specific functions, a single computer having sufficient speed, processing power, storage capabilities, and so on can alternatively be employed to perform all of the desired functions. Nevertheless, in the preferred embodiment the functions are separated such that commercially available personal computers are able to provide the required functions.

Thus, to the system a lesson plan is essentially a data file having a number of commands including control commands corresponding to functions available for operating the audiovisual playback resources $20_1$–$20_n$, and identifying label commands for identifying which of the audiovisual resources is to be connected to the monitor, and which further serve to identify the particular playback resource that the subsequent operational control commands will be directed to. Also typically included are delay time commands and step commands (pauses of indefinite length requiring physical action to resume) as described in more detail below. Preferably, all of the commands are stored in an ASCII format so that editing with an external word processor is also possible, as well as obtaining a human-readable hard-copy printout.

The way in which the data is organized, i.e., formatted, corresponds to the order in which the lesson plan will be presented to the classroom. In the preferred embodiment, the commands are organized in a sequential data format to directly correspond to a sequential presentation.

II. The Lesson Plan Software System

A. Creating a New Lesson Plan Command File

Figure 5:
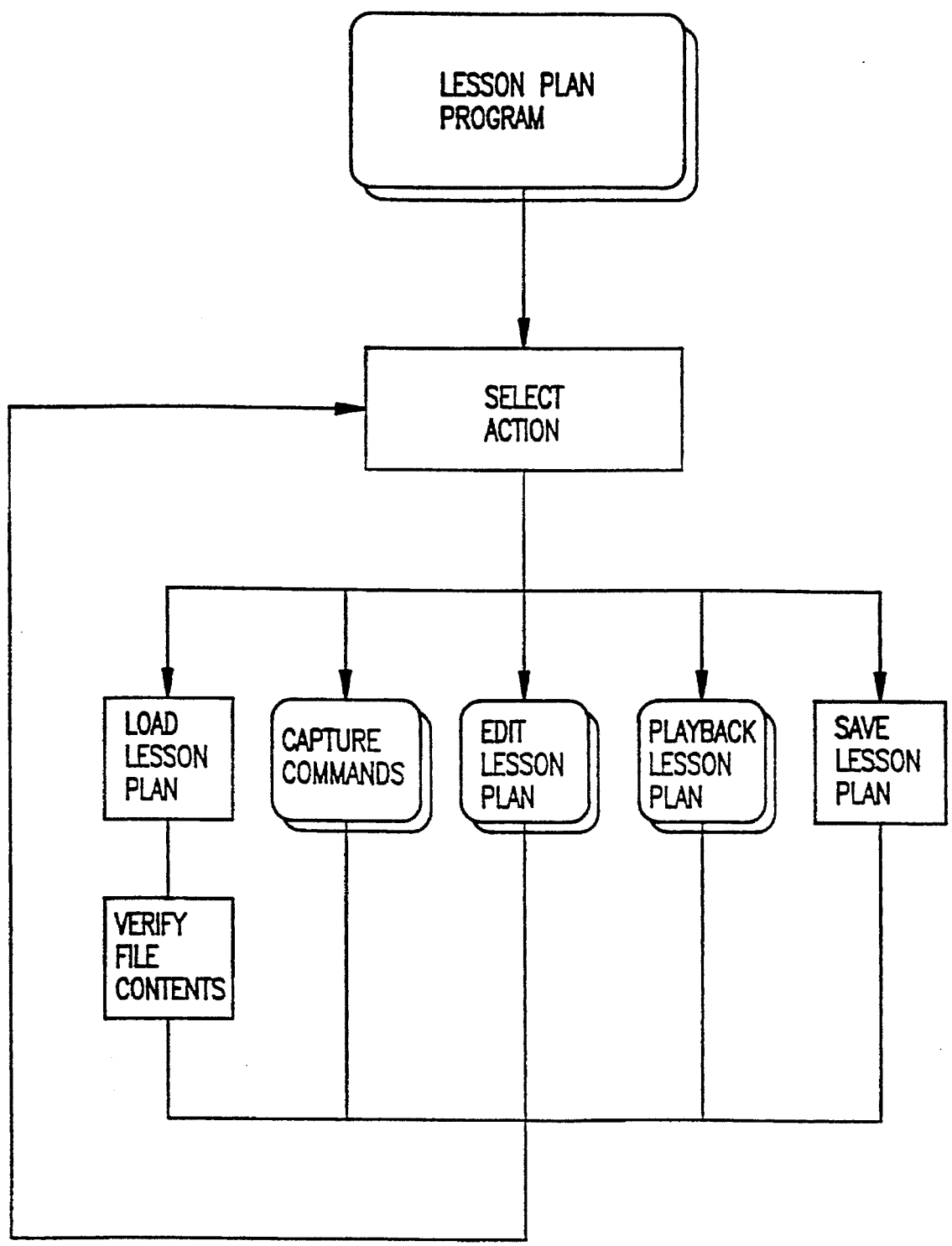
FIG. 5 is a flow diagram illustrating the operational flow of the lesson plan generating software program.

To create a lesson plan command file, the system provides a lesson plan software program (attached as Appendix A) for execution in one of the workstations. During program execution, the author of a lesson plan command file, i.e., the teacher, has a number of choices including creating an entirely new lesson plan in the workstation memory or loading an already existing lesson plan into the memory, for possible editing, modifying, previewing and so on. As shown in FIG. 5, the choices include loading an existing lesson plan into the workstation memory, capturing new commands into the plan, editing new and existing commands, playing back (previewing) a lesson plan, or saving the lesson plan from workstation memory to a permanent data storage file with an identifying file name.

To create an entirely new lesson plan command file, the teacher must first select the media which may be chosen for inclusion in the later-classroom presentation, and schedule it to ensure its availability during the creation process. Although not. necessary to the invention, the system (through a software program in the Media Center PC 26) preferably assists the teacher both with the selection and scheduling of the media as described hereinbelow.

Assuming the teacher has selected and scheduled the potentially desired media, at the scheduled creation date and time the teacher can begin the process of assembling whole or partial segments of the selected media into a unitary composite work for a future presentation. The commands necessary to operate the corresponding playback apparatuses $20_1$–$20_n$ are determined during this process and sequentially represented as commands in the lesson plan command file.

Figure 6A:
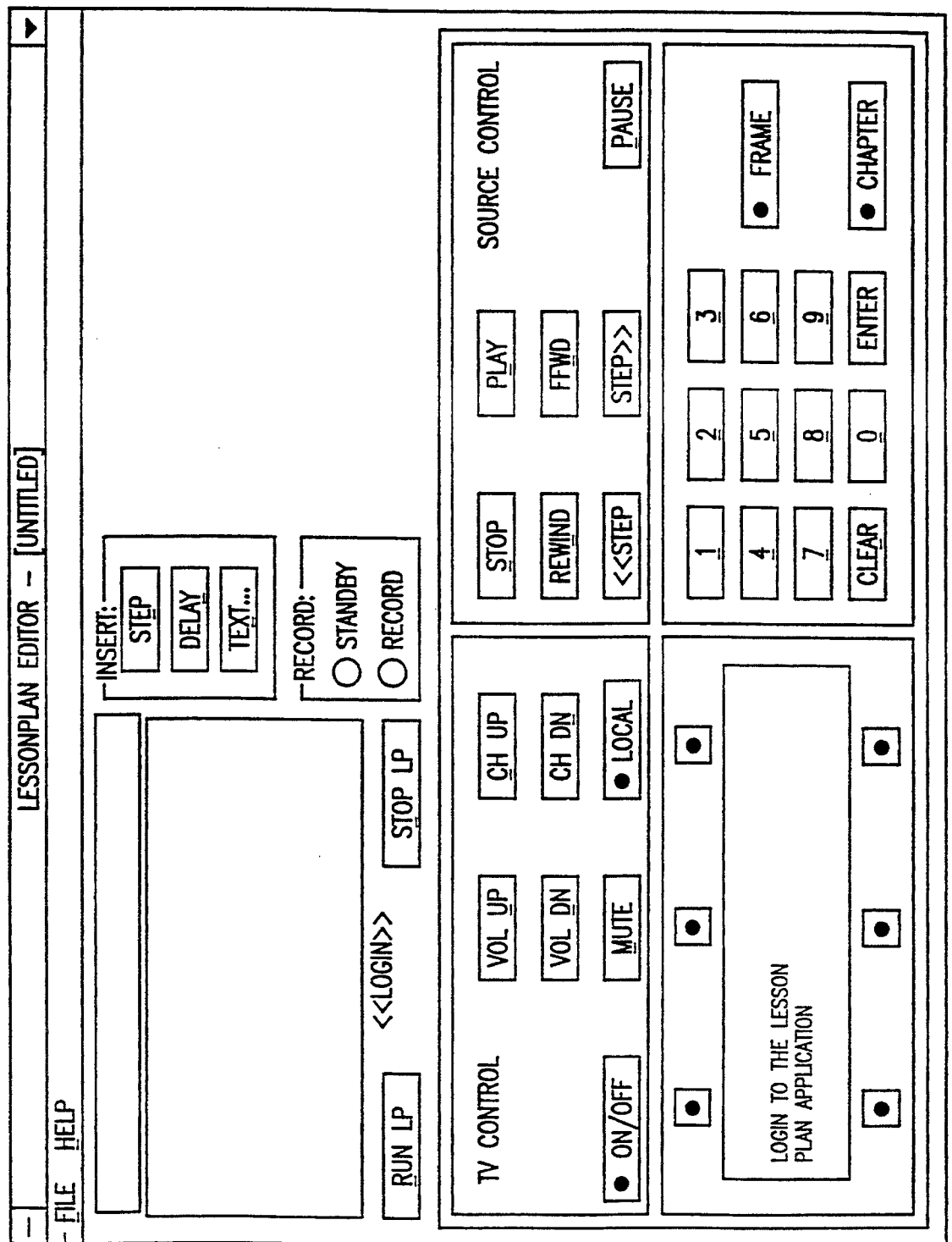
FIGS. 6a and 6b are pictorial representations of video screens which appears during the starting of the lesson plan generating software program.

In accordance with one aspect of the invention, the teacher develops in the workstation RAM 46a and stores as a data file a sequence of commands for switching and controlling audiovisual playback resources for later presentation in the classroom. To capture commands into the lesson plan file the teacher must first log into to program via the screen 59 shown in FIG. 6a. This is preferably accomplished by pointing and clicking the mouse button at the "File" command in the command line 64, or typing "F" for File in the conventional manner. This action causes a sub-menu (not shown) to appear including a "Login" selection, which when further selected provides a screen location for input of an identification code and password entry. After the login procedure, the screen of FIG. 6b appears. At this time, the teacher can either load an existing lesson plan file (for modifying, updating, playing back, and so on) as described below, or create an entirely new lesson plan file. Other methods of starting the lesson plan software are acceptable, for example bypassing the lt) logging-in step altogether and beginning the program automatically.

Figure 7:
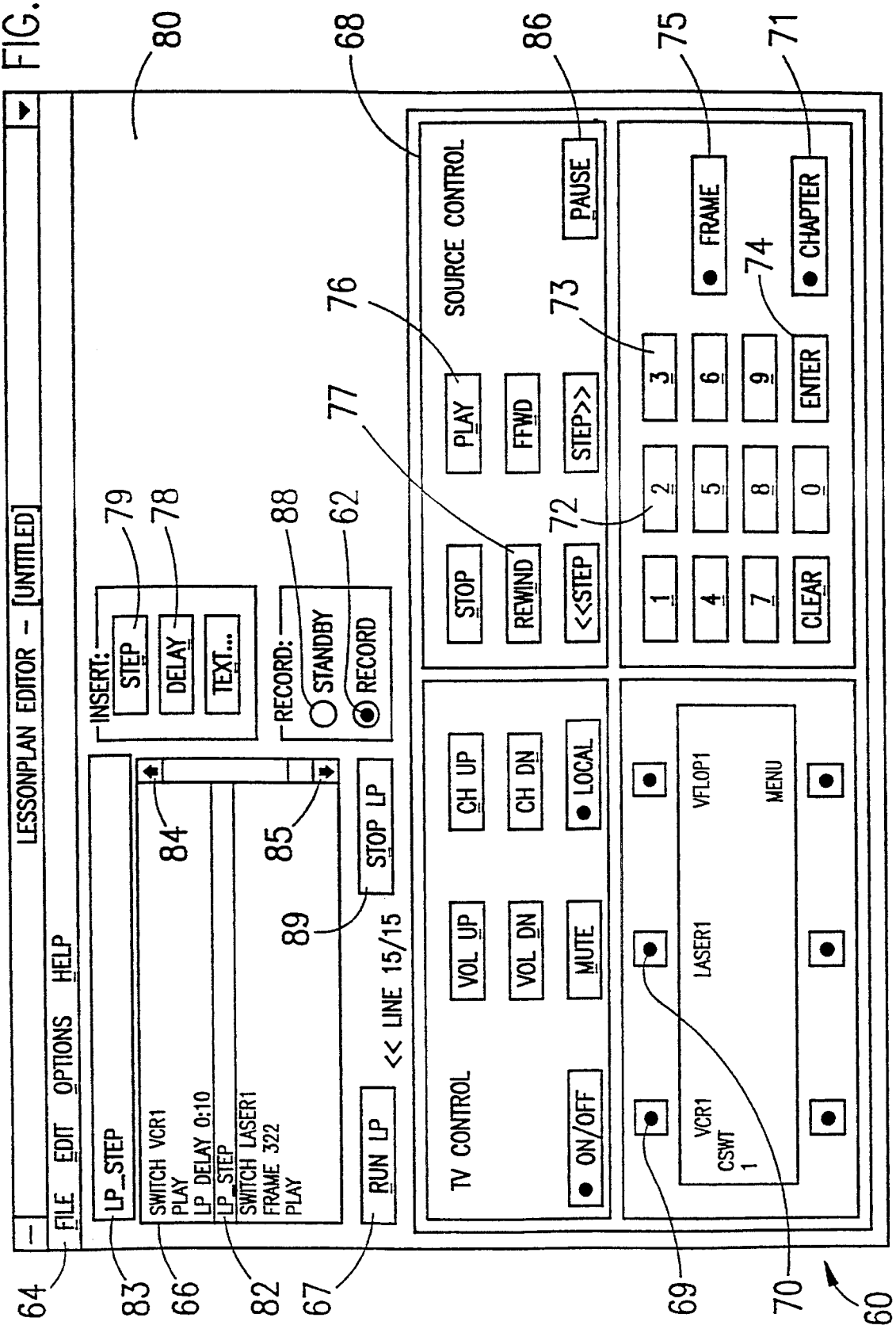
FIG. 7 is a pictorial representation of a video screen which appears during the recording of labels and control commands into the workstation memory for a lesson plan according to the invention.

In any case, to record (i.e., capture) commands into the workstation memory, the teacher enters the recording mode of the software program. FIG. 7 shows the screen generally designated 60 which appears on the workstation monitor (for example workstation monitor 46e₁) during the command capturing (i.e., recording) process. Additionally, FIG. 8 provides a general flow diagram of the steps taken when capturing commands.

The recording screen 60 includes a circular Record switch/indicator 62 which indicates the present recording mode of operation by the dot within in the circle. As a switch, the record mode switch/indicator 62 allows a teacher to toggle between the Record mode and the Standby mode (described below). The recording screen 60 also includes a menu bar function line 64 including File, Edit, Options and Help switches. These function switches are conventional Windows™-based functions that when activated provide sub-menus for opening files, cutting and pasting, and the like, or performing specialized system functions described below.

In the preferred embodiment, these on-screen switches and functions are actuated in a conventional manner, i.e., by utilizing a mouse (for example mouse $46g_1$) to point an on-screen cursor (not shown) to the switch's corresponding screen location and clicking an appropriate mouse button when properly positioned. Nevertheless, it can be readily appreciated that other methods of actuation are feasible, for example by depressing corresponding keys on a keyboard, sensing for touch-screen activation, and so on.

In keeping with the invention, the lower half 68 of the recording screen 60 is an on-screen reproduction of a classroom panel (such as the classroom panel $38_1$). The teacher captures (enters) commands into the workstation memory, ultimately for storage as a lesson plan command file, by pointing the on-screen cursor to these simulated classroom panel switches and clicking the mouse accordingly. Once selected, these commands are displayed as text in a window 66 appearing in the upper-left corner of the screen 60. It can be readily appreciated that window 66 is capable of scrolling so that only a portion of the commands currently in memory may actually be displayed at any given moment. Thus, for example, a videotape player (corresponding to identifying label VCR1) is selected by pointing the cursor at the VCR1 key 69 and clicking the mouse button. Thus, that particular identifying label command is indicated on the screen (although it might have instead scrolled out of window 66). This command, when transmitted by the Media Center PC 26 to the system controller 24 for execution, cause the output of the audiovisual resource corresponding to VCR1 (such as resource $20_1$) to be switched (i.e., connected by video matrix switch 32) to the monitor. Additionally, this command indicates that subsequent audiovisual resource control commands will be directed to the playback apparatus that corresponds to VCR1.

For example, the window 66 presently indicates that during the recording process the command "Play" was entered by the teacher. This was accomplished by pointing the cursor at the "Play" key 76 and clicking the mouse. Likewise, the next step, "LP_DELAY 0:10," (Lesson Plan Delay) indicates that play will continue for ten seconds, until the next command occurs. This is chosen by the teacher by selecting a special programming key known as the "Delay" key 78. This key automatically inserts a default delay time, the length of which can be modified in the Options menu. If desired, the delay time can further be edited as described hereinbelow.

Alternatively, the "Step" key 79 of the next command allows the previous command to execute but then halts the presentation until the teacher manually resumes the presentation. During the actual presentation the teacher will likewise need manual intervention to resume the presentation, thus enabling the teacher to pause indefinitely for discussion or other reasons.

Following the step command, another identifying label, "SWITCH LASERi" has been selected, in this case by pointing-and clicking the screen at the key 70 corresponding to LASER1. Again, this causes the system controller 24 to direct video matrix switch 32 to connect the playback apparatus corresponding to LASER1 (such as resource $20_4$) to the monitor. Further, this identifying label causes subsequent control commands to be directed to the playback apparatus assigned to LASER1.

It can readily be appreciated that the command-entering system is programmed to await a numerical entry after the selection of certain ones of the keys, including the "Chapter" key 71 or the "Frame" key 75. For example, to capture the command "FRAME 322," the Frame key 75 would first be actuated by the point-and-click routine. Such an entry would await a numeric entry, in the present example first by pointing the cursor at the "3" key 73 and clicking the mouse, then by pointing the cursor at the "2" key 72 and clicking the mouse twice, followed by pointing-and-clicking the "Enter" key 74. Accordingly, assuming that as shown the LASER1 command was the most recently chosen playback apparatus selection command, during subsequent execution of the command file the videodisc player assigned to LASER1 will advance the videodisc therein to a frame numbered as Frame 322.

Continuing with the present example, immediately after the Frame 322 command a "Play" command will be sent to the videodisc player corresponding to LASER1 by the system controller 24. This is because the "Play" command has been captured as the next command in the sequence, again through the same point-and-click procedure for Play key 76.

As illustrated in the flow diagram of FIG. 8, the other commands are captured in a like manner, thus enabling a teacher to create a sequence of commands that can be automatically executed at a later scheduled time. According to the invention, this enables a teacher to develop an audiovisual lesson plan in advance of a classroom presentation, utilizing any number of media in the presentation. As should be apparent, with the appropriate commands each individual medium can be presented in predetermined partial portions if desired and can easily be linked together with other media portions into a single complete lesson plan for presentation.

It is important to realize that the lesson plan software does not edit together video segments to create a single recorded medium for later playback, but rather automatically executes the commands necessary to coordinate a number of playback apparatuses and media therein in such a way that it appears to be a presentation from a single audiovisual source. Nevertheless, the audio and video output as a result of executing the command file may easily be recorded onto a single medium (such as a videocassette) in a conventional manner merely by tapping into the audiovisual lines with an appropriate recorder.

In the preferred embodiment of the invention, the workstations $46_1$–$46_n$ are also connected to the multiplexed output of the video matrix switch 32. This, along with demultiplexers $48_1$–$48_n$ and a special video adapter card (preferably a Super Video Windows board from New Media Graphics Corp. or its equivalent) present in the workstation enables the teacher to view the actual media output in an upper right corner preview window 80 of the recording screen 60 on the workstation monitor (for example workstation monitor $46g_1$) during the creation of the lesson plan command file. Thus, during the play step described previously, the teacher views and hears the actual audio and video presentation as the play command is captured and executed.

However, since not every workstation will necessarily have such a card and video connection, it is also possible to bring a workstation computer into a classroom and utilize the classroom monitor therein for viewing the media during the creation process. All that is necessary is a connection from the workstation to the Local Area Network. Of course, a classroom monitor could likewise be brought to the workstation computer, however a video connection along with a demultiplexer would similarly need to be provided for that monitor.

Figure 6B:
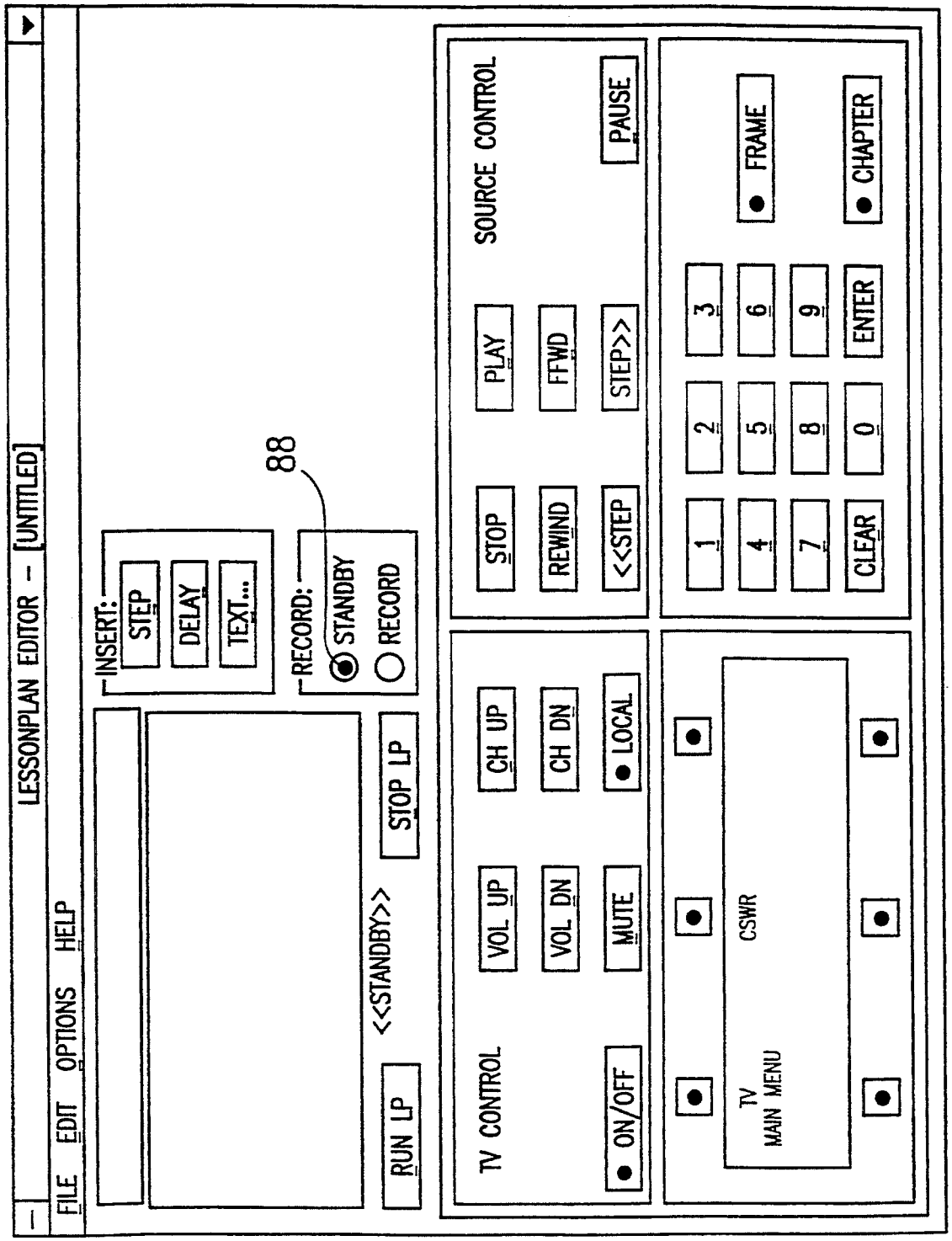

To assist with the exact recording of the proper commands, a Standby switch/indicator 88 is available on the screen. When activated, (as shown in FIG. 6b), the standby switch/indicator 88 allows the teacher to enter a standby mode wherein commands are activated without being captured in memory for the command file. Thus, for example, a teacher can advance to a certain frame on a videodisc to locate the exact starting point desired, without having to actually capture the commands used to locate that frame. Once determined, the teacher can re-enter the record mode by pointing-and-clicking at the Record switch/indicator 62 and capture the steps necessary to achieve that desired frame number.

Since such a passive previewing capability via the standby mode is also available during the creation procedure, the teacher can perform a significant amount of trial-and-error experimentation to determine exactly which media segments to include in the finalized lesson plan command file for the later classroom presentation. Moreover, if the teacher desires to rearrange, delete, insert or otherwise modify any commands in the sequence, a number of standard editing techniques are available. First, by selecting the Editing function on the menu line 64, the teacher can access the conventional cut, paste, and copy functions from an editing sub-menu which will appear (not shown). As is well known in such software applications, the Edit submenu is pulled down via the usual point-and-click procedure or by typing "E" on the keyboard. Accordingly, command lines can be cut from the file or pasted or copied elsewhere in the file sequence.

Additionally, the teacher can modify the sequence of commands by inserting additional new commands between other commands. This is accomplished by moving a highlight bar 82 to the desired location in the window 66, for example by pointing-and-clicking scrolling control arrows 84 and 85. Moreover, the teacher can modify the current line by typing over the current highlighted line which appears at screen location 83. Additionally, during previewing in the Standby mode the teacher can select the Run key 67 or Stop key 89 to start running the lesson plan to reach the desired point in the program. The teacher then stops the running presentation by selecting the Stop key 89 before the next step is executed. By returning to the Record mode and entering a new command, for example a pause command via Pause key 86, the program inserts the new command at the highlight bar 82.

Other functions are also available in menu line 64 to assist the teacher in creating the command file. The "Expand Video" function, selected as a sub-function in the Options sub-menu, allows the teacher to toggle between the regular upper-right corner preview screen 80 and an enlarged preview screen that occupies most of recording screen 60 for easier viewing. The "Description" function, similarly in the Options sub-menu allows textual comments to be added to the lesson plan currently being displayed. When selected, the function enables the creator of the lesson plan to include a description of the lesson plan for purposes of future reference.

The "Courseware" function, also selected from the Options sub-menu, provides the teacher with a full list of the media (courseware) and corresponding playback machines that have been scheduled for possible inclusion in the lesson plan currently being created, and thus are presently available. Finally, a "Help" function is available which when selected will provide textual information to assist the teacher in understanding and properly performing the various program procedures.

B. Saving the Lesson Plan Command File

Figure 10:
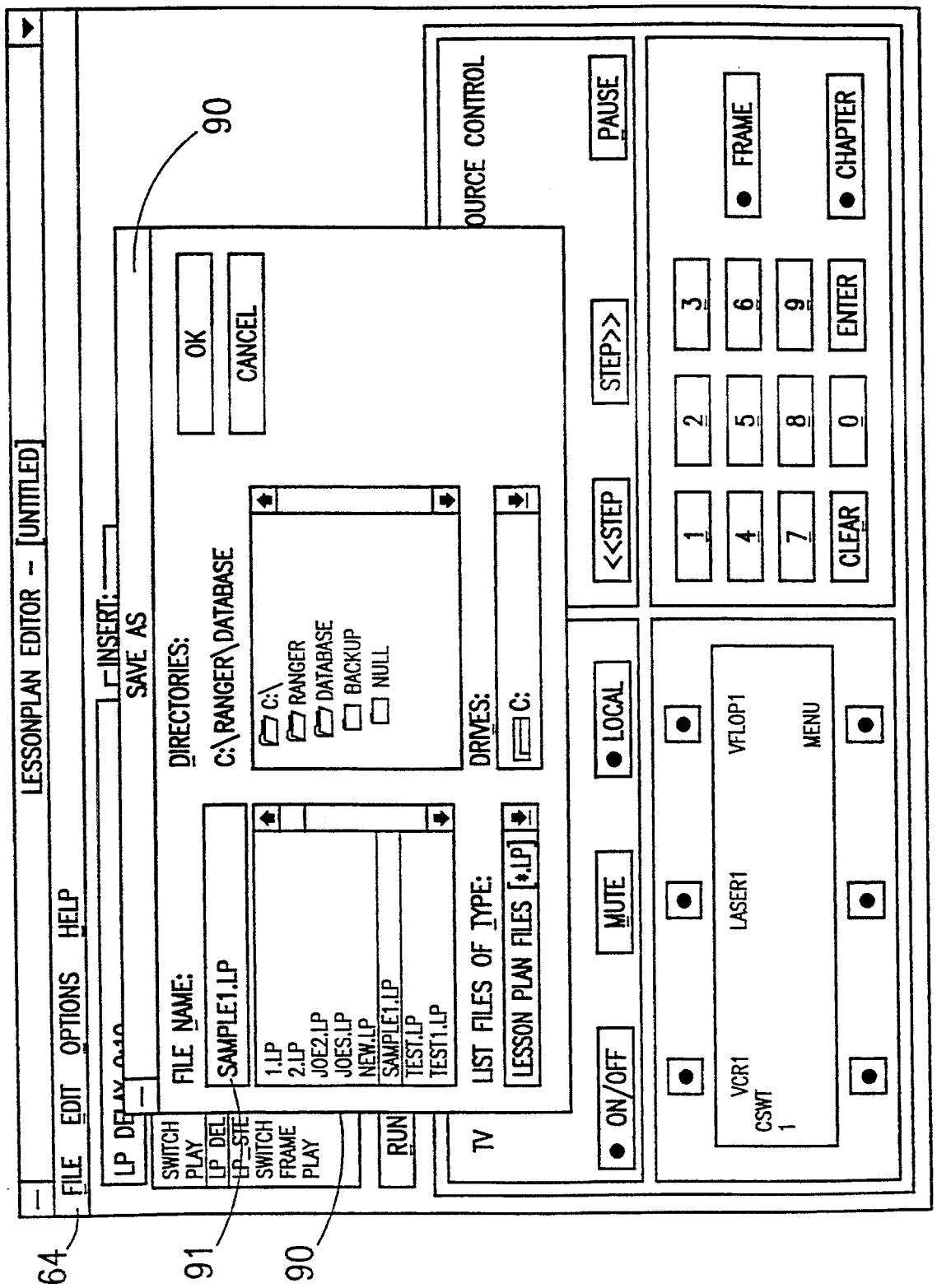
FIG. 10 is a pictorial representation of a video screen which appears during the saving of a lesson plan command file from workstation memory to a fixed storage medium having an identifying filename.

Once the teacher determines that the desired commands are in the proper sequence, the teacher can save the commands from memory into a lesson plan file, generally to a hard or floppy disk. This is accomplished by selecting the "File" function on the menu line 64. As is well known in software applications, this selection (via the usual point-and-click procedure or by typing "F" on the keyboard) causes a File sub-menu to appear. The teacher merely selects the "Save As" sub-function in the conventional manner from the sub-menu, which causes the save window 90 of FIG. 10 to appear. The teacher can then save the file by typing in a DOS-acceptable filename at the filename entry location 91, preferably with an ".LP" extension. In the preferred embodiment the system automatically provides the proper ".LP" extension. Additionally, it should be noted that the teacher can save and update throughout the creation procedure to protect against potential loss of substantial work efforts due to power outages and the like.

C. Loading an Existing Lesson Plan Command File

Figure 11:
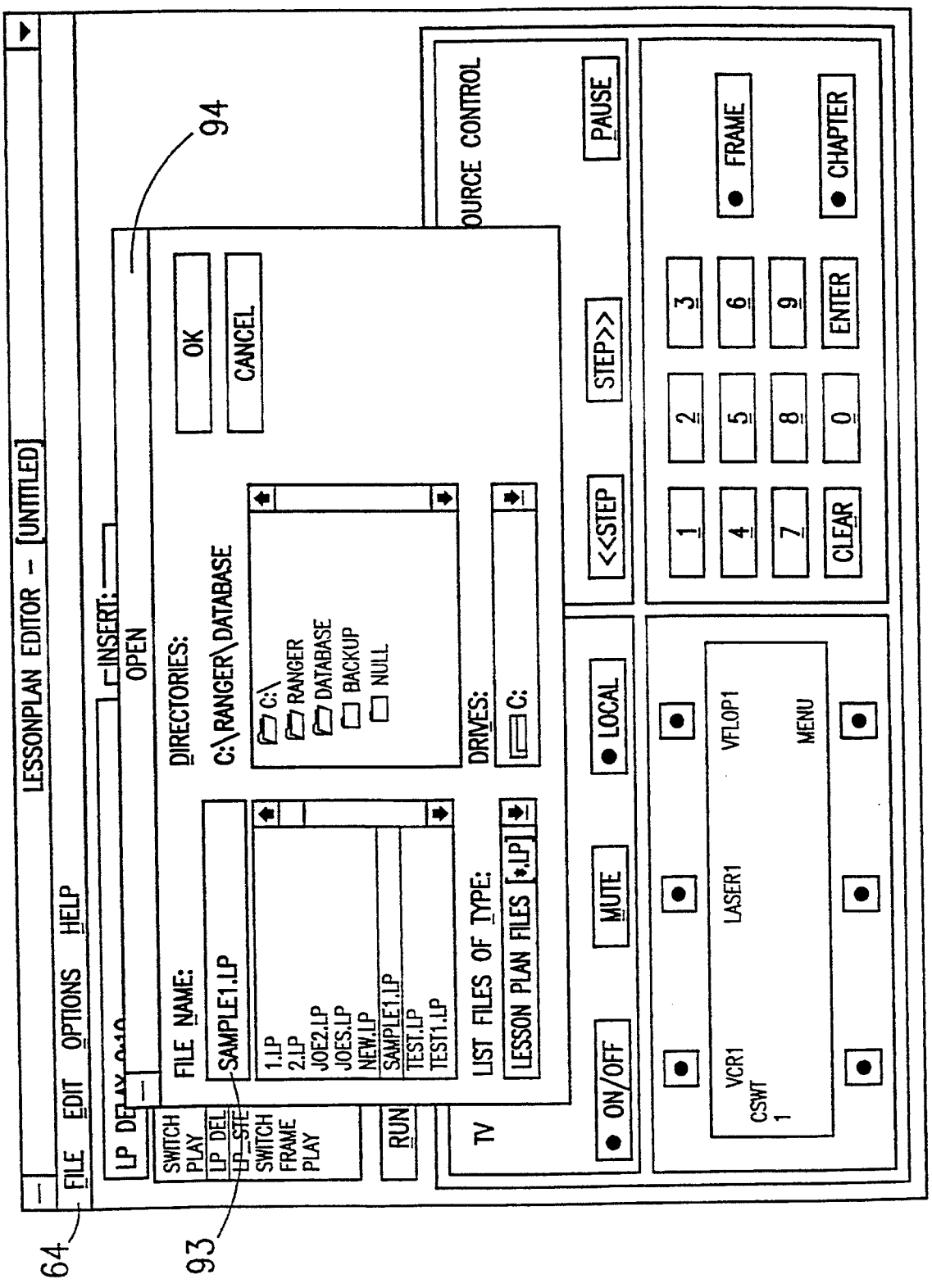
FIG. 11 is a pictorial representation of a video screen which appears during the loading of a lesson plan command file into the workstation memory.

Once a lesson plan command file has been previously created and saved, it can be reloaded into the workstation memory. This is accomplished by choosing the "File" function with the point-and-click or "F" key as described hereinbefore. Once selected, the file sub-menu appears; by selecting the standard "Open" function of the sub-menu, a list of files with the appropriate ".LP" extension appear in a file-opening window 94 as shown in FIG. 11. The desired file is then chosen by filename in the conventional manner, i.e., by scrolling, highlighting and entering, typing, and so on at screen location 93, and loaded into memory such that the file is essentially equivalent to having just been created as previously described.

Once loaded into memory, the commands can be verified. This feature enables a teacher to ensure that the proper command file has been loaded. For example, the teacher might wish to read the textual description (by selecting the Options/description function as discussed previously) to ascertain that the present lesson plan was the most recently edited version, and so on.

D. Editing an Existing Lesson Plan Command File

Provided that the corresponding media and playback apparatuses have also been scheduled, once loaded into memory an existing lesson plan command file can be edited in the same manner as during the creation procedure described hereinbefore. Such editing capabilities allow teachers to develop partial lesson plans when time permits and then add to such plans without having to abandon their prior work. Similarly, editing allows teachers to update existing files (by saving with the same filename), or to create new plans without having to "start from scratch" and duplicate efforts when a similar command file exists (by saving an edited plan to a new filename). Of course, read-only protections can be included to prevent accidental overwriting of existing lesson plan command files.

In any case, editing an existing file is performed as shown in FIG. 9, in a manner very similar to the editing described hereinbefore during the creation procedure, except that a teacher starts with already existing commands in the workstation memory rather than a blank workstation memory. To assist in the editing process, the teacher can similarly select the standby mode via switch 88 to move through existing commands without recording them into memory and then enter the record mode via switch 62 to record additional steps as described previously.

E. Previewinq an Existing Lesson Plan Command File

Another important aspect of the invention is the ability to preview the audiovisual performance which results from the lesson plan commands currently in memory. Regardless of whether creating an entirely new file or starting with an already existing file, this feature allows a teacher to perfect the command file in advance of the future presentation.

Figure 12:
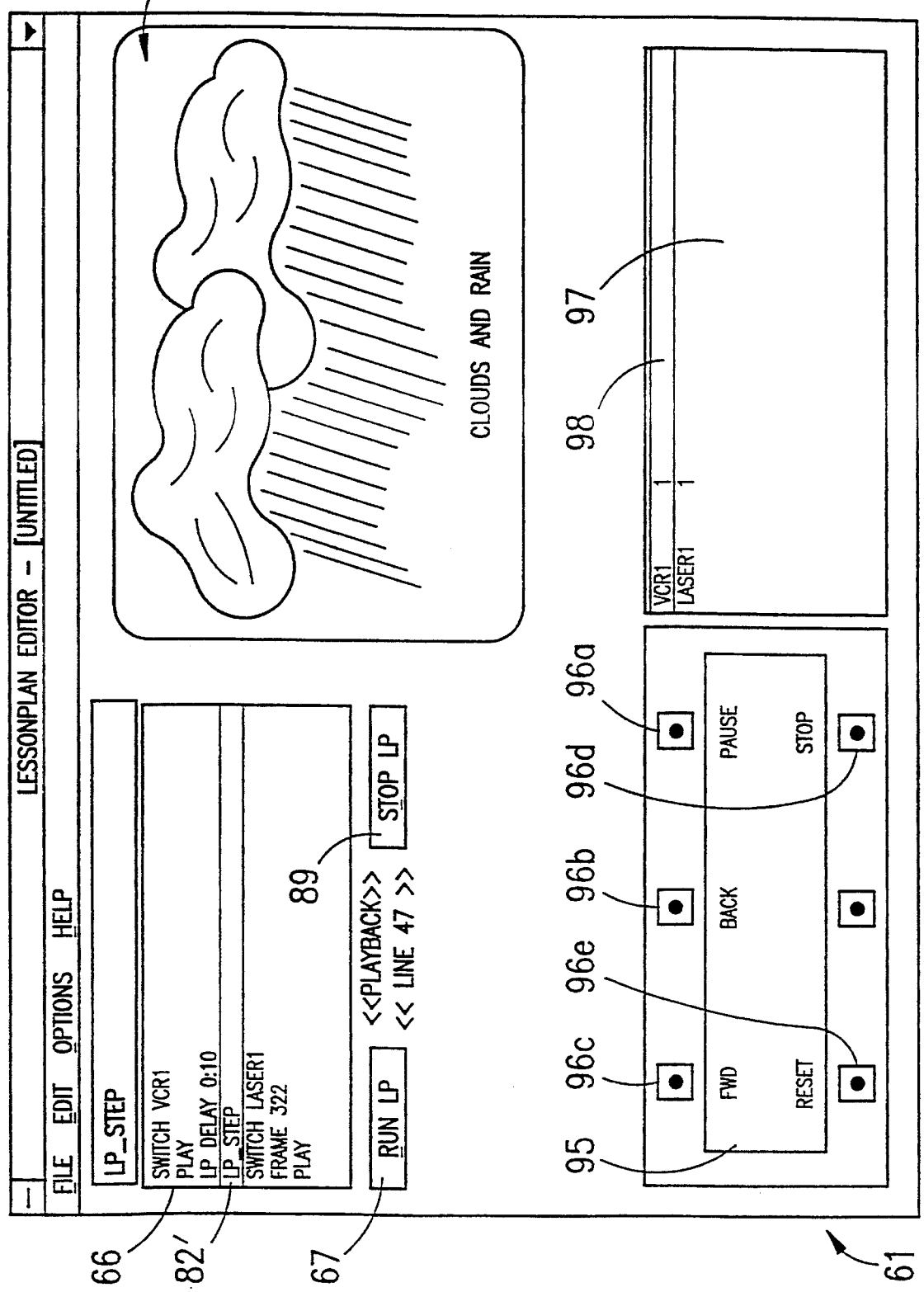
FIG. 12 is a pictorial representation of a video screen which appears during the previewing of a lesson plan command file within the workstation memory.
Figure 13:
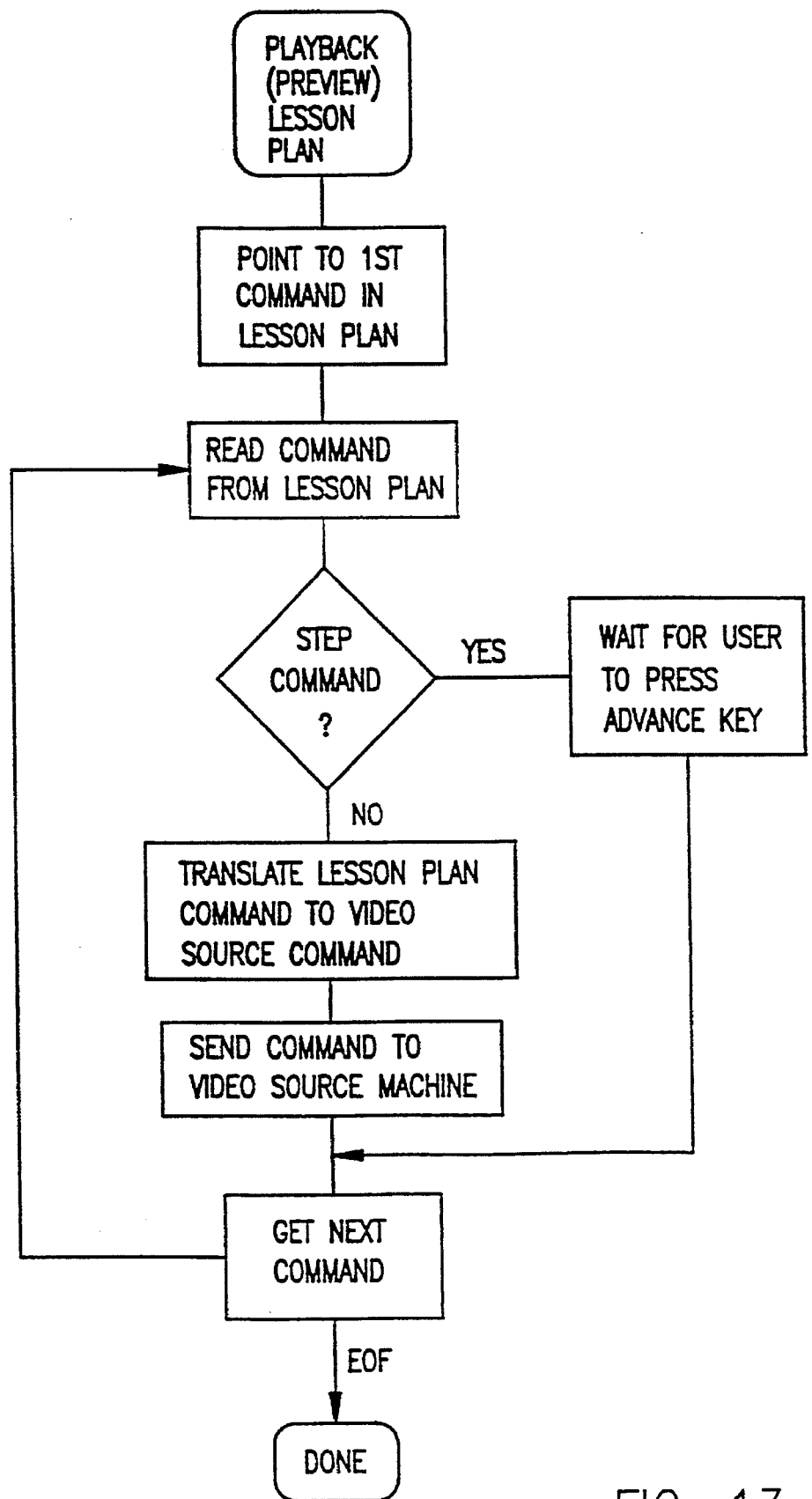
FIG. 13 is a flow diagram illustrating the steps taken during the previewing of a lesson plan.

FIG. 12 shows the video display screen 61 on a workstation monitor $46g_1$ of workstation $46_1$ that might appear during the playback (i.e., previewing) of one possible lesson plan. FIG. 13 illustrates the flow of how commands are interpreted for playback. The window 66 (within the video display screen 60) lists the textual representation of a small portion of a lesson plan command file. The playback will be visible in screen location 80. Since no steps can be recorded during the previewing function, only certain commands corresponding to the currently connected audiovisual resource VCR1, i.e., Pause 96a, Back 96b, Fwd 96c, Stop 96d, and so on are available in screen window 95. Additionally, a Reset key 96e is available, which when selected in the conventional point-and-click manner results in the lesson plan resetting to the first command. The currently connected audiovisual resource, VCR1, is indicated by highlight bar 98 in a list of resources in the lesson plan appearing in window 97.

As described previously, these commands are present in the workstation RAM $46a_1$ and correspond to identifying labels for playback apparatuses or commands for operating such apparatuses. The playback (previewing) feature is activated by entering the Run mode via Run key 67 with the usual point-and-click procedure.

Assuming the window 66 has not yet scrolled, (i.e., the SWITCH VCR1 identifying label command is the first in the command file), when activated the "VCR1" command ultimately notifies the system controller 24 which playback resource $20_1$–$20_n$ should be switched to the appropriate monitor or monitors $36_1$–$36_n$. For example, audiovisual resource $20_3$ might correspond to VCR1. Accordingly, both for current previewing and when later downloaded to the system controller 24 for classroom presentation, upon execution of this command the system controller 24 will direct the video matrix switch 32 to switch the audio and video outputs of audiovisual resource $20_3$ to the proper destination monitor (for example workstation monitor $46g_1$ or classroom monitor $36_2$).

The identifying label command also notifies the system controller 24 which playback resource $20_1$–$20_n$ that subsequent operational control commands are directed at. Thus, as shown in FIG. 12, when executing the file the next command, "Play," is interpreted by the system controller 32 to be a control command directed to the connected audiovisual resource $20_3$ (VCR1). This control command is then executed by the system controller 24 by providing an appropriate signal on line $22_3$ such that the "Play" function of VCR1 is activated. Thus, whatever videotape medium that is currently within VCR1 will be seen (and heard) on workstation monitor $46g_1$ or classroom monitor $36_2$. As also shown in FIGS. 12 and 13, subsequent commands will be treated in the same manner.

So that the teacher is aware of the current steps within the file during the previewing of the lesson plan, the screen window 66 scrolls through and displays a range of commands before and after the current command being executed. The exact command currently being executed is highlighted via highlight bar 82'. Thus, in FIG. 12, the highlight bar 82' indicates that a Step command is being executed, which means that the lesson plan is halted indefinitely and requires manual action to resume. During an actual classroom presentation, the playback will be resumed through the actual classroom-panel accompanying the classroom monitor, which might be triggered manually or by infrared remote control as discussed previously. After manual action is taken, the SWITCH LASER1 command will be executed, which indicates that LASER1 will be connected to the monitor and that subsequent commands will be directed a videodisc player corresponding to LASER1.

III. Media Center PC Software Proqram

A. Database Selection of Media

As described previously the media center PC 26 contains a database of all available media, along with an internal list of all available machines. Thus, to assist in selection and scheduling, the media center PC 26 must continually be updated each time a machine is added, removed for maintenance, and so on, and each time a new copy of a media is added to or removed from the media library. Additionally, the software program being executed in the media center PC 26 should be capable of adapting to cancellations of reserved equipment and media so as to maximize availability of presumably limited resources.

To assist teachers with selecting potential material to include in a lesson plan for presenting to students, the system preferably includes a database of all available media. Although theoretically any number of media might be included in a lesson plan presentation, the preferred system limits the teacher to selecting a maximum of ten resources in order to conserve materials for other teachers.

Preferably the database includes cross-referencing capabilities by search fields including author, subject matter, applicable age group, keywords within a brief synopsis, catalog number, title or media type. In the preferred embodiment, the teacher can logically combine together these search fields to narrow down the number of matching entries found. Moreover, the database may also be arranged to include an entry for all lesson plan command files that utilize a particular media, so that teachers can analyze previously developed lesson plans to help minimize duplication of effort.

For example, FIG. 14 illustrates a screen 100 which might appear either on the media center PC monitor 26e or a workstation monitor such as $46e_1$ during a teacher's search for media dealing with acid rain. For assistance, the teacher might first pull up a window 102 containing suitable keywords for the search. Once at least some information is entered, the teacher selects the Find key 104, which results in the screen filling up with matched information. For example, screen location 105 would be filled with text representing the Catalog Number corresponding to a medium found. If more than one entry is found, a list of all matching entries would appear for the teacher to select from or narrow with a subsequent modified search.

Alternatively, the screen illustrated in FIG. 14 is utilized to add entries into the database, through the use of the Clear key $103_1$ to clear the screen entries, the New key $103_2$ when a new entry is being added (i.e., not updating an existing entry), and the Save key $103_3$ for saving the entries to the database. Additionally, entries can be deleted with the Delete key $103_4$, however such an action preferably requires some additional authorization.

As shown in FIG. 15, the entire courseware catalog can also be displayed on a screen 110 to assist teachers in selecting possible media. Selection is made by manipulating highlight bar 112 in the conventional manner, i.e., by pointing-and-clicking and utilizing scrolling keys 114 and 116. To further assist the teacher, the database fields $120_1$–$120_n$ are sorted alphabetically and/or numerically in dependence on the sorting command selected and displayed at screen location 118.

It can be readily appreciated that existing lesson plan command files can be included in the database. Thus, in FIG. 15, a number of lesson plan command files, denoted by "Lesson Pl" in the Media field $120_1$, appear in the database list. Accordingly, a teacher can select lesson plans either for editing or previewing on a workstation, or for an actual classroom presentation. The only difference is whether a workstation or classroom is chosen for receiving the output from the audiovisual resources. This is controlled by the system controller 24 directing the video matrix switch 32, and is selected in the scheduling function below.

B. Scheduling Media and Playback Apparatuses

Although not necessary to the invention, the preferred system further incorporates scheduling means to prevent conflicts from occurring since the number of media, playback machines and classrooms or workstations is necessarily limited. Thus, once the media has been selected for possible inclusion into a lesson plan, in the preferred embodiment the teacher schedules the found media (courseware) materials and corresponding playback apparatuses. For example, if a teacher desired to present at least one portion of an educational videodisc, inspect a videotape for possibly related material, and also present a still-image "slide show," the teacher would first need to reserve the disc, tapes, and discs containing the still images, along with a videodisc player, videotape recorder, and video still image player.

It can be readily appreciated that the same selection and scheduling screens can be utilized to select lesson plans for presentation to the classroom instead of a workstation. Accordingly, selection for the actual classroom presentation functions in an identical manner as is scheduling for working with a lesson plan at a workstation, i.e., the system ensures the availability of the media and playback apparatuses when creating or previewing lesson plan command files, and for the later classroom presentation of the prearranged plan. Thus, if the plan has already been created, the teacher enters a date and time that the materials and resources within that lesson plan are requested for, along with a classroom destination that the audiovideo signals will be sent to.

Figure 16:
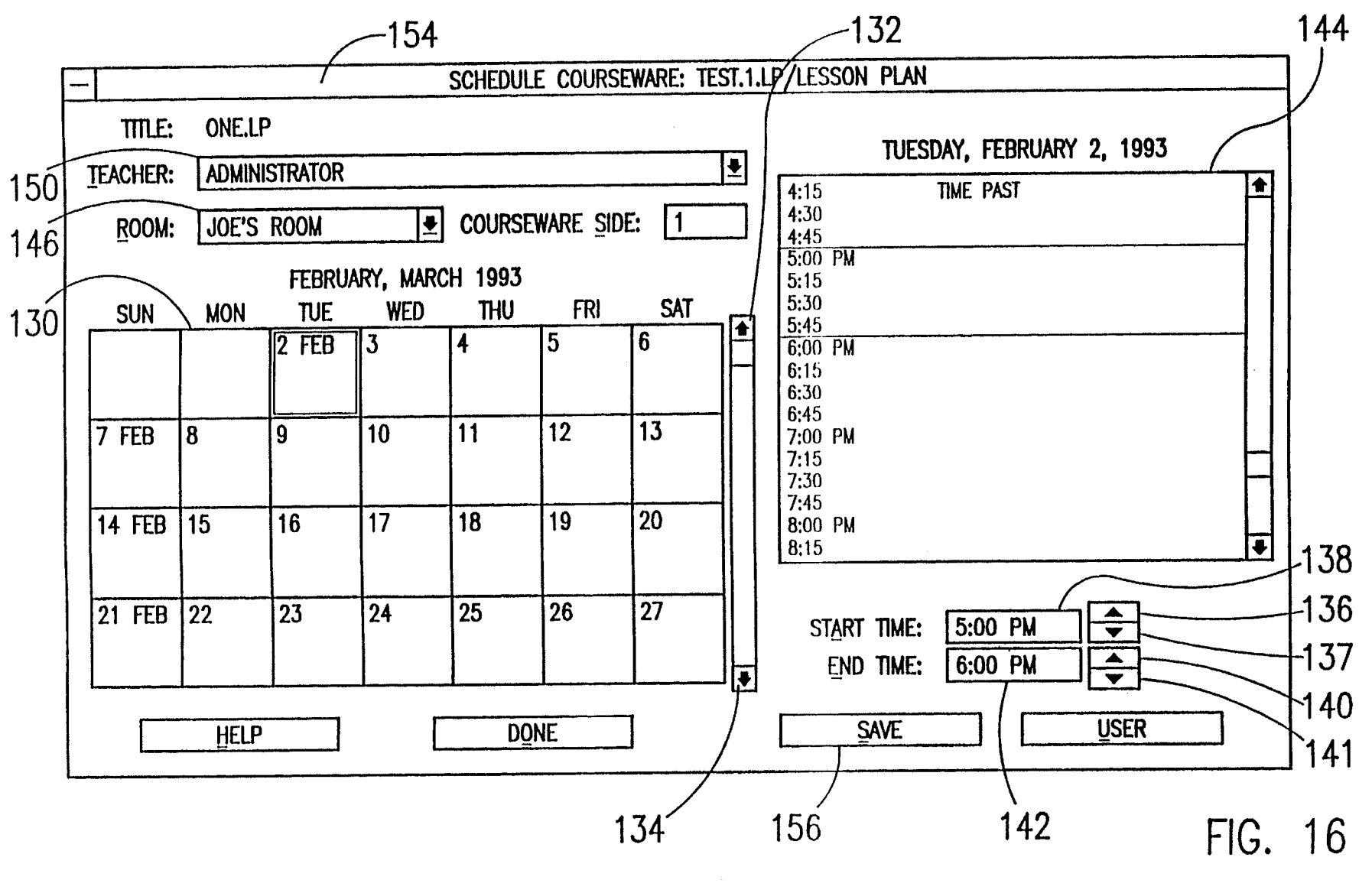

In any case, in the preferred embodiment scheduling is selected from one of the courseware selection screens by selecting the "Schedule Record" key 106 (FIG. 15), either by the conventional point-and-click procedure or by typing an "R" (Schedule Record) on the associated keyboard. Subsequently, as shown in FIG. 16, to ensure that the equipment and media will be available for putting together a lesson plan command data file or presenting an existing lesson plan to a classroom, the scheduling program provides a screen which allows the teacher to enter a date and time that the materials and resources are requested for, along with a workstation that the audiovideo signals will be sent to.

To this end, the teacher can select the date by pointing-and-clicking the desired date in screen location 130 which provides a calendar for the selected month. Months are selectable by pointing-and-clicking at scrolling arrows 132, 134. Similarly, the start time of the request is selected (preferably in fifteen minute increments) via arrows 136 and 137 and appears in window 138, while the end time is chosen via arrows 140 and 141 and appears in window 142. Additionally, the start and stop times are selectable by typing an "a" (upper or lowercase) on the keyboard (for Start) or an "E" (for End) respectively. Once selected, the presentation time is blocked off by a highlight bar in a window 144.

Figure 17:
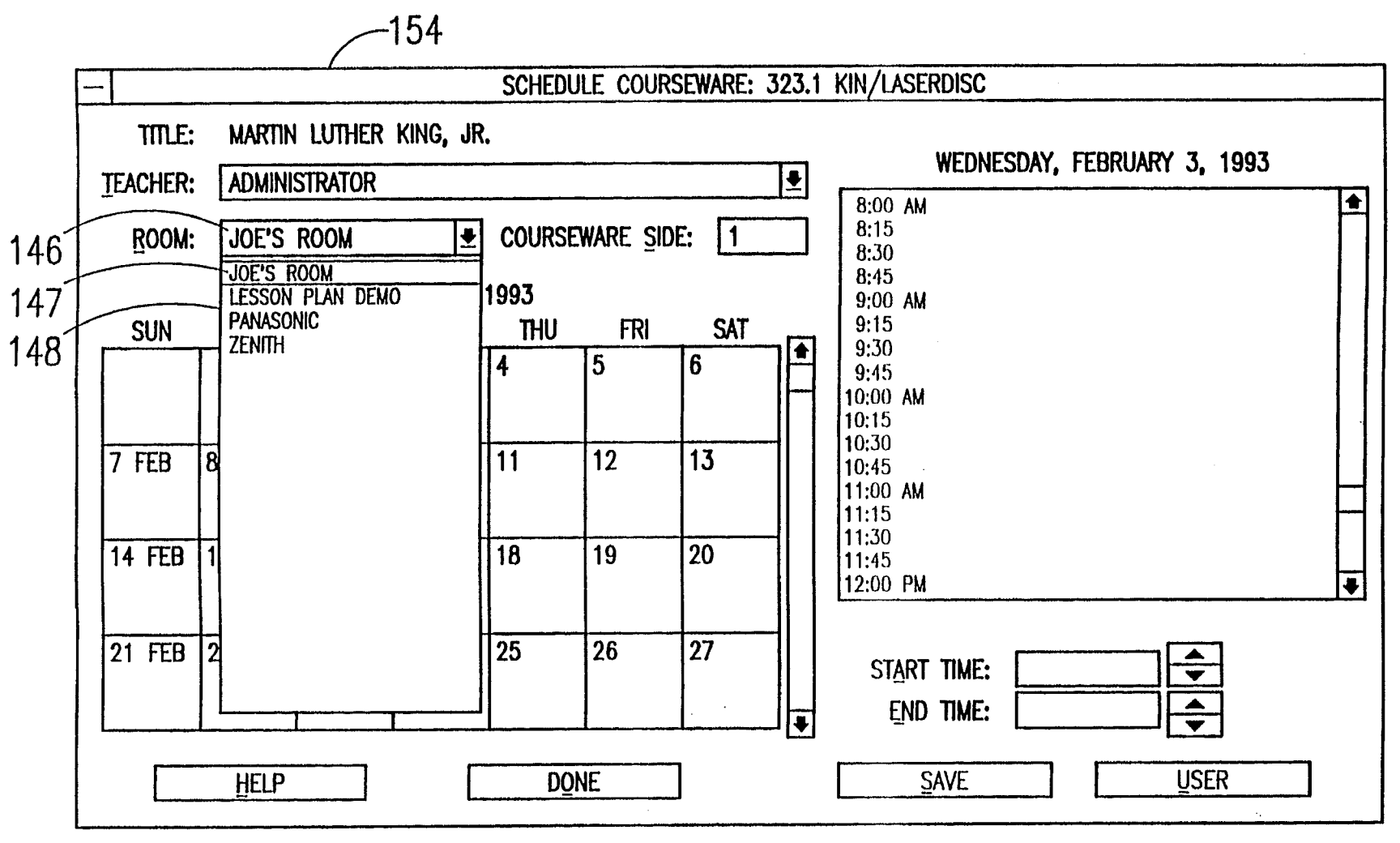

The room (or workstation) for the presentation is selected by typing in or otherwise entering in a conventional manner an appropriate room (or workstation) location at screen location 146. For example, as shown in FIG. 17 typing an "R" (for Room) or pointing-and-clicking while at the room screen location 146 will cause a window 148 of all available rooms to appear on the screen. Selection is then performed in the conventional point-and-click manner for sub-menu selections, i.e., moving the highlight bar 147 and clicking when appropriately positioned.

Figure 18:
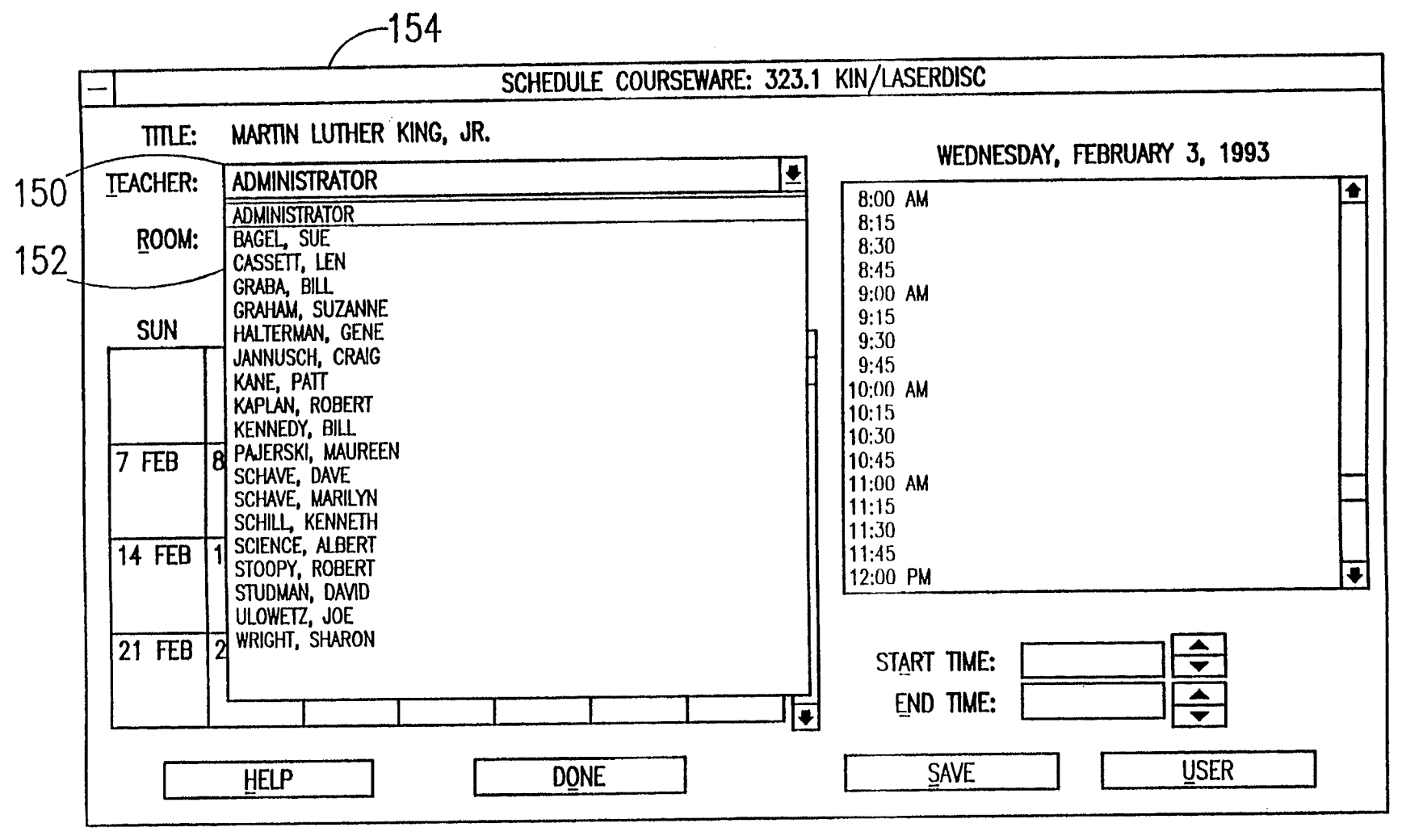

Additionally, the system allows for the scheduling of the presentation of a single playback apparatus and medium without requiring an actual named lesson plan. Thus, in FIGS. 16 and 19, as indicated by the top line screen location 154, a lesson plan has been chosen as the media to present while in FIGS. 17 and 18, a single medium has been reserved as indicated by the same screen location 154.

If an individual medium rather than a multiple-media lesson plan is selected, the scheduling program determines if the medium and corresponding playback apparatus is are available at the desired date and time. Alternatively, if a lesson plan is selected, the scheduling program automatically scans the lesson plan file for all required media and playback apparatuses. Thus, to the teacher a lesson plan is equivalent to a single medium selection, although realistically there is a greater chance of some of the media already being reserved. Nevertheless, the teacher selects a lesson plan as if it were a single medium requiring a corresponding playback apparatus.

In the simple case of scheduling a single-medium presentation, the teacher indicates the medium requested along with the date, time and location for the presentation as described previously. Additionally, the total time that these presentation elements are reserved for must be indicated, however, it is feasible that the system could calculate the total time based on the length of the medium. Regardless, the scheduling request is made either by having the teacher directly enter the information into the system, or indirectly by having the teacher simply write out the request on a piece of paper for the audiovisual personnel or other such persons to enter into the system. To this end, the system preferably allows the scheduling request to be entered from any of the workstations or from the media center PC. In any case, once the request is entered, the system verifies the availability of the medium and a playback apparatus at the requested time and date and stores this information into a memory organized in a calendar-like structure or the like for loading to the system controller at the appropriate time and date, and also to use as a reference when verifying availability against other such requests.

In the case where a lesson plan command file is requested, the teacher simply designates, by the stored name, which lesson plan is to be performed and the time, date and location for the performance. The system automatically analyzes the commands in the file to determine what playback apparatuses and media are required and compares them against its existing reservation schedule to determine if every necessary piece is available.

Similarly, prior to developing a lesson plan, teachers need to ensure that they can connect their workstation to the necessary playback apparatuses to display their selected media. This is to enable portions to be edited precisely, sequenced and so on as described hereinbefore. Accordingly, the appropriate media and playback apparatuses need to be reserved, along with a workstation. Therefore, when creating a lesson plan, the availability needs to be verified the same as when presenting an already existing plan.

Since a lesson plan essentially appears to a teacher to be a single composite medium, even though it may contain numerous media played on several types of resources, to edit an already existing lesson plan a teacher merely schedules the plan by name for connection to an appropriate workstation at the appropriate time. If desired, the teacher may also schedule other materials for replacing part of an existing lesson plan or adding to it, inserting into it, and so on. The edited plan is then saved under the same name or a new name.

Finally, the teacher is selected from a list of possible candidates in the identical manner. When a "T" (for T̲eacher) is typed at the keyboard or the Teacher window 150 is selected in the conventional point-and-click manner, a sub-menu 152 appears listing possible teachers. Again, the teacher is selected in the conventional manner. Although not necessary, this function enables the system to notify a teacher as to exactly why materials are unavailable (i.e., another named teacher has already reserved them for that date and time) should this be the case.

Figure 19:
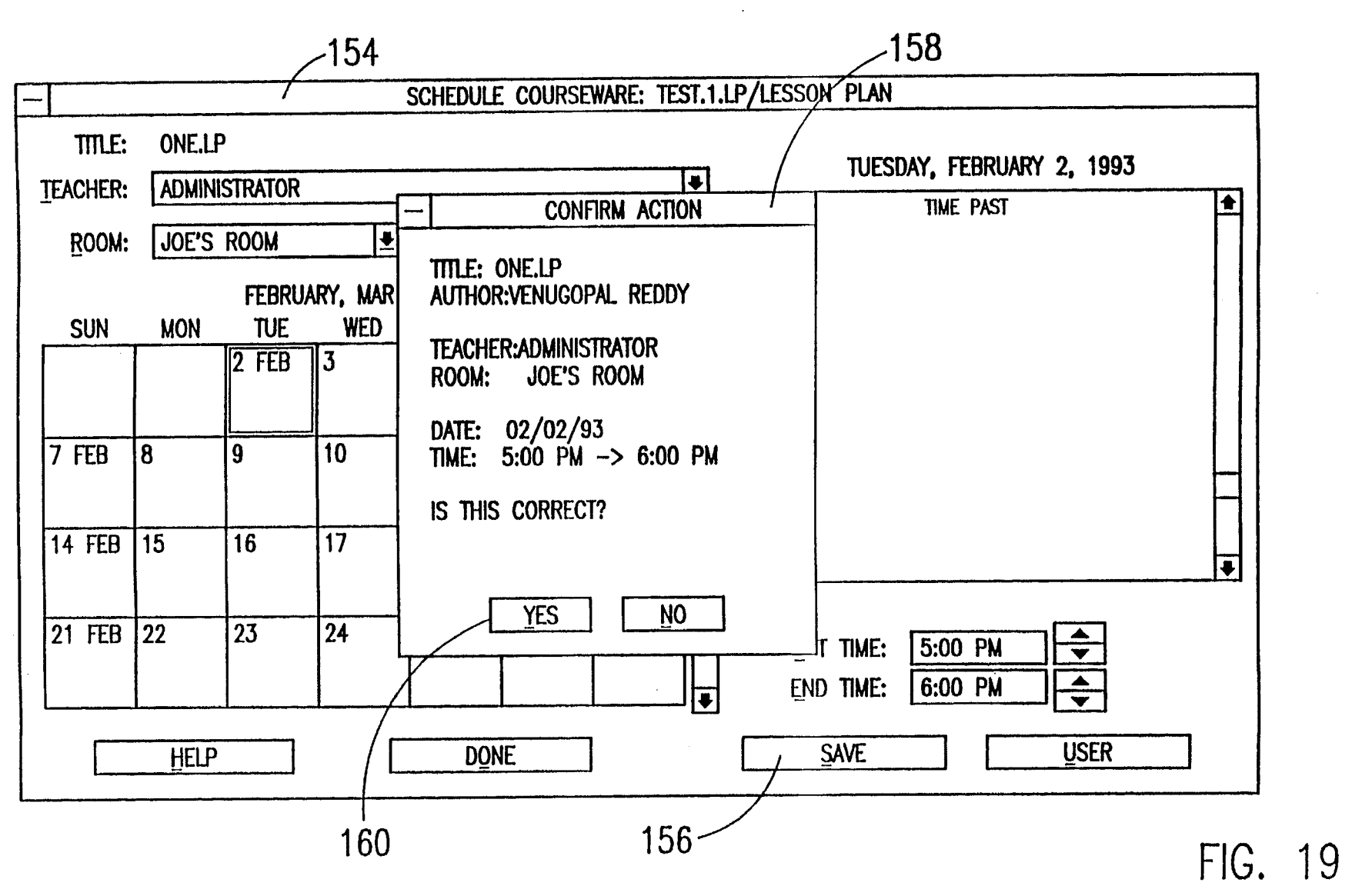

Finally, once the scheduling is performed as desired, the teacher selects the "Save" key 156. As shown in FIG. 19, this action causes a confirmation window 158 to appear so that the teacher can verify the action to be taken. If confirmed through pointing-and-clicking the "Yes" key 160, (or by typing "Y" for Y̲es), the system then internally saves the information necessary for the presentation, i.e, records the media, resources, and classroom or workstation as reserved.

In all of the aforementioned scheduling procedures, if the required media and playback apparatuses are available, a subsequent confirmation message may come up on the screen, a hard-copy printout may be made, or the like. Alternatively, no action can be taken, thereby indicating the request was allowed. However, when availability is not confirmed, a message indicates so, and preferably indicates (on the screen or in a hard-copy printout) exactly why the request cannot be granted. Such an itemized denial enables a teacher to determine an alternate course of action, for example, scheduling a different date or later time when the medium would be available, showing a different lesson plan, and so on.

Since the scheduling data is present in the system, it is feasible to include means for obtaining the scheduling information for analyzing system needs and usage. For example, a review of the scheduling patterns of teachers might reveal a shortage of videodisc players and an excess of videotape recorders, which would be useful in allocating next year's equipment budget. Likewise, one teacher might consistently have a scheduling conflict with another teacher, which might best be resolved by staggering scheduled class times rather than obtaining duplicate media and/or playback apparatuses.

As can be seen from the foregoing detailed description, a computer-based lesson plan system for facilitating the presentation of audiovisual information to students and the like has been provided. For this purpose, a system and method for generating the lesson plan is disclosed that automatically controls the presentation of predetermined portions of audiovisual material from a number of sources. The lesson plan also coordinates with a scheduling system to automatically verify the availability of the media and correspondingly required playback apparatuses at a desired presentation time, and is integrated with a courseware database to assist with the selection of appropriate presentation materials. With the system and method, only certain user-selected segments of the materials selected for presentation are presented, and remotely controlled in a programmed order predefined by the user.

What is claimed is:

1. In a system for providing audiovisual output signals from a plurality of audiovisual resources to a plurality of monitors, an apparatus for connecting a selected one of the resources to at Least one of the monitors and for controlling the operation of the selected resource, comprising:

an input device for receiving input information and including a transmitter for transmitting wireless signals representative of the received information, the information including the identity of the selected audiovisual resource and at least one control command corresponding to a controllable operation of that audiovisual resource;

a memory means;

a receiver for receiving the wireless signals transmitted from the input device;

a processor means operatively connected to the receiver and the memory means for reading the information transmitted from the input device and for writing the information into the memory;

a switching network for connecting signals from the audiovisual resources to the monitors;

a communication mechanism connected to each of the audiovisual resources for providing remote control signals to the audiovisual resources for controlling the operation thereof; and a controller means for reading the memory means and for controlling the switching network to selectively connect the selected audiovisual resource identified in the memory means to at least one monitor, and for reading the control command in the memory means and for transmitting a remote control signal corresponding to that command on the communication mechanism to control the operation of the selected audiovisual resource to provide audiovisual output signals from the selected audiovisual resource to at least one monitor.

2. The apparatus of claim 1 wherein the communication mechanism includes a transmitter for transmitting infrared signals to remotely control the selected resource.

3. The apparatus of claim 2 wherein the transmitter of the communication mechanism includes a light emitting diode coupled to the selected audiovisual resource.

4. The apparatus of claim 1 wherein the Lnput device includes an infrared transmitter for transmitting received input information to the receiver via infrared signals.

5. The apparatus of claim 4 wherein the input device comprises a hand-held remote controller.

6. The apparatus of claim 1 wherein the input device includes a radio frequency transmitter for transmitting received input information to the receiver via radio frequency signals.

7. The apparatus of claim 1 wherein the audiovisual output signals from the selected audiovisual resource are distinct audio and video signals, and further comprising means for combining the distinct audio and video signals from the selected resource into a combined audio and video signal on a transmission line that provides the combined signal to an input of the switching network.

8. The apparatus of claim 7 wherein the switching network switches the combined signal, and further comprising means connected to an output of the switching network for separating the combined signal into distinct audio and video signals.

9. The apparatus of claim 1 further comprising a non-volatile storage medium operatively connected to the processor means, wherein the processor means reads information from the memory means and writes the information into the non-volatile storage medium.

10. In a system for providing audiovisual output signals from a plurality of audiovisual resources to a plurality of monitors, a method of connecting a selected one of the audiovisual resources to at lease one of the monitors and controlling the operation of the selected resource, comprising the steps of:

receiving input information on an input device, the information including the identity of the selected audiovisual resource and at least one control command corresponding to a controllable operation of that audiovisual resource;

transmitting wireless signals from the input device representative of the received information;

receiving the wireless signals and writing by a processor means the information represented by those signals as electronic data into a memory means; and reading the memory with a controller means to determine the selected audiovisual resource identified therein and controlling a switching network via said controller means to selectively connect signals from that selected audiovisual resource to at least one monitor, and reading the memory means to determine the control command identified therein and transmitting a remote control signal corresponding to the control command onto a communication mechanism to control the operation of the selected audiovisual resource to provide audiovisual output signals from the selected audiovisual resource to at least one monitor.

11. The method of claim 10 wherein the transmitting wireless signals from the input device representative of the received information are infrared signals.

12. The method of claim 10 wherein the step of transmitting a remote control signal corresponding to the control command comprises the step of modulating a light emitting diode coupled to the selected audiovisual resource.

13. The method of claim 10 wherein the audiovisual output signals from the selected resource are distinct audio and video signals, and further comprising the step of combining the distinct audio and video signals from the selected audio visual resource into a combined audio and video signal.

14. The method of claim 13 further comprising the step of separating the combined signal into distinct audio and video signals before the signals from the selected audiovisual resource are provided to the monitor.

15. The method of claim 10 further comprising the step of writing the information from the memory means to a non-volatile storage medium.

* * * * *